April 8, 1969 W. W. SALISBURY 3,437,862

METHOD AND APPARATUS FOR PRODUCING HIGH TEMPERATURES BY A MAGNETIC FIELD SURROUNDING AN ELECTRIC ARC

Filed July 19, 1957

Inventor
Winfield W. Salisbury
by John J. Pederson
Attorney

Inventor
Winfield W. Salisbury
By John J. Pederson
Attorney

Inventor
Winfield W. Salisbury
by John J. Pederson
Attorney

Fig. 8
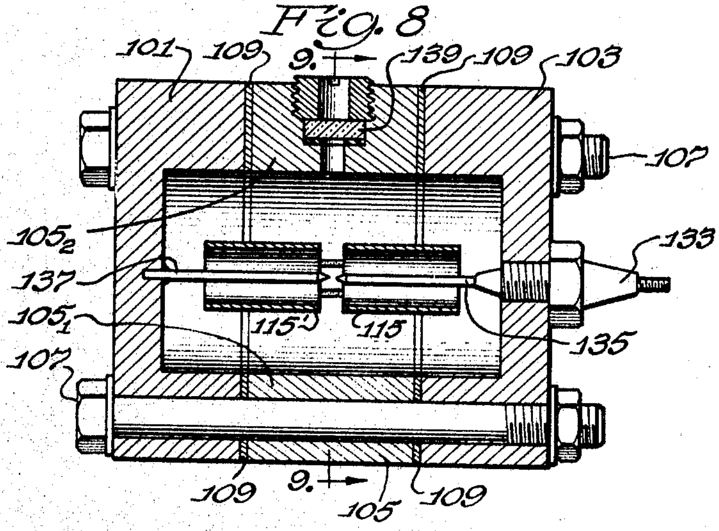
Fig. 9
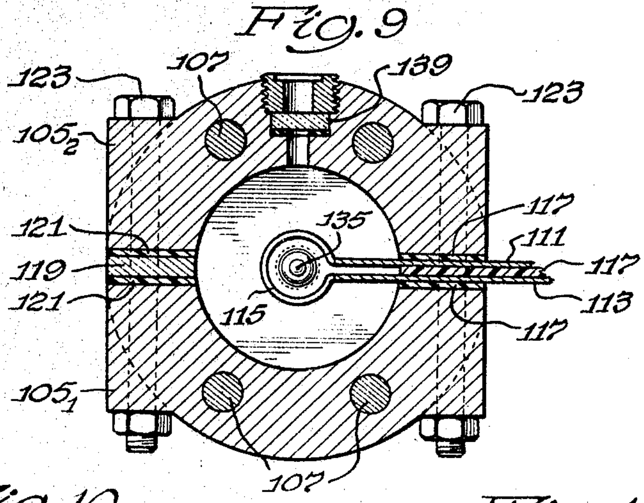
Fig. 10 Fig. 11
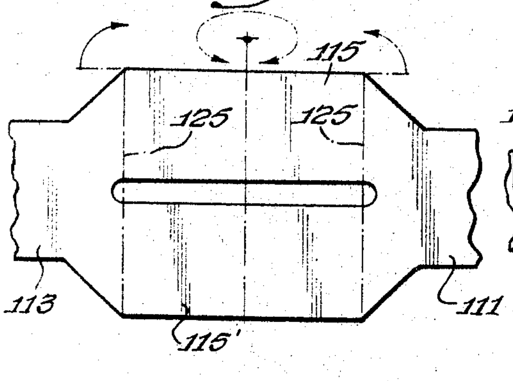
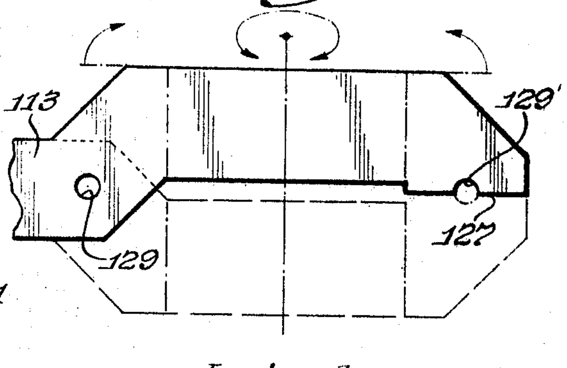
Inventor
Winfield W. Salisbury
by John J. Pederson
Attorney Inventor
Winfield W. Salisbury
by John J. Pederson
Attorney Inventor
Winfield W. Salisbury
by John J. Pederson
Attorney Inventor
Winfield W. Salisbury
By John J. Pederson
Attorney Inventor
Winfield W. Salisbury
by John J. Pederson
Attorney Inventor
Winfield W. Salisbury
by John J. Pederson
Attorney Inventor
Winfield W. Salisbury
by John J. Pederson
Attorney Inventor
Winfield W. Salisbury
by John J. Pederson
Attorney Inventor
Winfield W. Salisbury
By John J. Pederson
Attorney Inventor
Winfield W. Salisbury
by John J. Pederson
Attorney United States Patent Office 3,437,862
Patented Apr. 8, 1969

3,437,862
METHOD AND APPARATUS FOR PRODUCING HIGH TEMPERATURES BY A MAGNETIC FIELD SURROUNDING AN ELECTRIC ARC

Winfield W. Salisbury, Palo Alto, Calif., assignor to Zenith Radio Corporation, a corporation of Delaware Continuation-in-part of application Ser. No. 510,311, May 23, 1955. This application July 19, 1957, Ser. No. 673,077
Int. Cl. H01j *61/28;* H05b *31/26;* G21b *1/00*
U.S. Cl. 313—161 36 Claims This application is a continuation-in-part of the copending application of Winfield W. Salisbury, Ser. No. 510,311, filed May 23, 1955, for Means To Produce High Temperatures in Gases, and assigned to the same assignee as the present application.

This invention relates to the heating of materials in the gaseous state while substantially preventing material loss of energy from the heated body by convection from the heated zone or conduction to the walls of the container. Since the relative proportion of the energy introduced into a body of gas which is lost through these two causes increases very rapidly with temperature, the invention finds its greatest value in the production of ultra-high temperatures, and particularly of tempertaures which are above the melting point or even above the vaporization point of refractory materials which are available for containing the heated material, but the principles involved are of general utility, and can be applied in heating to any temperature under conditions such that the gas to be treated becomes ionized. There is thus no definite lower limit to the applicability of the invention. The upper limit is set by a number of factors which will vary with the material being treated; this may be the point at which the loss of energy by radiation occurs as rapidly as energy can be supplied, or it may be the point at which the pressure generated by the heated gas becomes uncontrollable. As will be shown hereinafter, the expedients employed in the invention make even these limitations less restrictive than would appear at first sight, and, since all known substances become gaseous at sufficiently high temperatures, the restriction to gases is merely a restriction as to state and not as to material.

There are various purposes for which the production of very high temperatures is valuable. Many reactants will take place under high temperature which will not go under other conditions. There is a general rule of thumb as regards chemical reactions, for example, to the effect that the speed of reaction approximately doubles for each rise in temperature of 10 degrees centigrade. High temperature spectroscopy can be an extremely valuable tool, both in basic research and in the control of industrial processes, and there are various other purposes for which the ability to produce ultra-high temperatures would be of value. In its broadest aspect, the present invention is considered to reside in the production and control of extremely high temperatures for all purposes and is not limited to the application of the temperatures so produced to specific uses.

The invention is also directed to methods and apparatus for inducting controlled thermo-nuclear fusion, in which the energy liberated is available as a power source, or a source of radiation of manageable proportions, instead of as a catastrophic explosion.

It is generally recognized that thermo-nuclear reactions require temperatures in the general neighborhood of several million degrees absolute. So far as results have been published up to the present time, the only effective means of raising materials to such temperatures artificially have been through the use of atomic fission reactions, conditions leading to an explosive or catastrophic release of energy. Means of controlling the release of energy in such combined fission-fusion reactions are not at present known.

At temperatures within the reactive range all materials are in the gaseous phase, molecules are dissociated into their constituent atoms and the atoms are ionized. In order that the collisions between nuclei be sufficiently probable so that the reaction will be self-sustaining, the gas is usually maintained at an elevated pressure, preferably corresponding to many atmospheres, even at the start of the reaction and as the reaction progresses in a given volume of gas, even though some degree of expansion be permitted, the pressures developed are enormous, exceeding the crushing strength of most available materials if they persist for an appreciable time.

If the nuclear fusion action is to take place in a small volume of gas, there arises the difficulty of pouring energy into the gas faster than it is dissipated from it. Loss of thermal energy from a given volume of material occurs by convection, by conduction, and by radiation, the first two of which are directly proportional to the area of the surface enclosing the volume. (The plasma may not be considered as a black body, so the radiation loss is a volume phenomenon.) Since for a sphere, which has a minimal surface for a given volume, the ratio of surface area to volume varies inversely with the diameter, it is more difficult, with respect to heat loss, to raise a small volume of material to a given temperature than a large one.

Thermo-nuclear reactions which will liberate energy are probably most practical for materials of low atomic number. Both atomic species of low atomic number and those of high atomic number may liberate energy if transformed into species lying in the middle range, that is, energy may be released at low atomic numbers through fusion and at high atomic numbers through fission. It is conceivable that fission as well as fusion may occur at sufficiently elevated tempertaures. The chief reactant in reactions which should occur most readily are hydrogen, and its known isotopes, deuterium and tritium. Throughout this specification the word "hydrogen," except when qualified by the term "isotope," will be used to designate $_1H^1$, that isotope wherein the nucleus comprises a single proton, $_1H^2$ and $_1H^3$ being designated as deuterium and tritium respectively. Another feasible source is $_2He^3$, helium of atomic weight 3.

Hydrogen isotopes, as such, can be made to react with lithium (atomic number, $Z=3$), berryllium ($Z=4$), and possibly boron ($Z=5$), as well as with each other and with $_2He^3$. Reactions between deuterium nuclei, resulting in approximately equal amounts of tritium and $_2He^3$, plus neutrons and energy, are particularly attractive, but deuterium-lithium, tritium-tritium or deuterium-tritium reactions are typical of other feasible reactions.

With a hydrogen isotope as one of the major reactants, the radiation loss becomes a small proportion of the power to be supplied to initiate the reaction. Hydrogen is a very poor radiator of energy of the wavelengths developed by it at the temperatures here considered, and its isotopes are only slightly better radiators. The major loss of energy in a body of hot ionized gas occurs through conduction to the walls of the container which may enclose it, and since conduction is, to at least a first approximation, a linear function of temperature difference, loss of energy by conduction from even a small volume of gas tends to be very fast indeed.

Something of the magnitude of the problems involved can be appreciated from a numerical example. A one-millimeter sphere of deuterium at 100 atmospheres pressure and 1000 degrees Kelvin has a theoretical energy content equal to the amount of chemical energy of about 0.0086 pound or .011 pint of gasoline. Raised to a temperature of 10 million degrees Kelvin, the pressure, if maintained within this same volume, would increase to about $4 \times 10^6$ or four million atmospheres, or somewhere in the neighborhood of seventy-six million pounds per square inch. If the problems of heat less by radiation, conduction, and convection could be solved, so that all of the energy supplied to a volume of deuterium were retained by it, the total energy required to dissociate, ionize, and heat it to the reacting temperature would be only about $1/60,000$ of the energy released, and once enough energy were supplied to initiate the reaction the remainder of the energy would come from the reaction itself. The problems that arise are therefore not those of providing enough energy to cause a reaction to start but those of retaining the energy so that it will not be lost faster than it is supplied and of containing the reaction products, including the heat generated, so that they can be used in maintaining and elevating the temperature.

The primary object of the invention is to provide means for raising materials in the gaseous state to ultra-high temperatures under accurately controllable conditions. Other objects are to provide means for producing ultra-high temperatures in a body of gas while preventing excessive temperature rises in the apparatus wherein such high temperatures are produced, maintaining such apparatus within a range of temperature where structural materials retain their strength and normal physical properties; to provide means for heating a small body of gas within a larger body without material loss of energy by convection into the larger body during the heating process; to provide apparatus in which a body of gas can be heated within a container without loss by conduction to the walls of the container while the heating is in process, so that such loss does not set a limit to the temperature which can be obtained in the heated gas; to provide a means for producing ultra-high instantaneous temperatures within a body of gas while maintaining the average temperature at moderate values; to provide means whereby certain materials can be made to absorb very large quantities of energy with extremely small loss by convection, conduction, or radiation; to provide heating apparatus wherein the mechanical stresses produced by the heating can be sustained for the brief interval required by the inertia of the parts of the apparatus rather than through excessive weights or cross-sections of the parts; to provide electrical heating apparatus wherein electrical stresses can be maintained without the use of heavy insulators or the danger of break-down of the insulation which is employed; and to provide apparatus wherein, through the use of pulse techniques, the nonlinear relation of the energy losses to temperature from materials at high temperature can be used to the advantage of the process rather than to its detriment.

A further and obviously tremendously important object of the present invention is to provide a method of and apparatus for initiating a controllable nuclear reaction of the fusion type. This involves, as subsidiary objects, containing the pressures developed by the reaction; controlling energy losses from a body of gas entering into the reaction to a degree which will permit the necessary temperatures to be attained; providing apparatus in which, within a given reaction chamber, the quantity of material entering into the reaction, and therefore the release of energy by it, can be controlled; providing a process whereby the walls of the reaction chamber are not subjected to extreme reaction temperatures or pressures; and providing an energy source which may be used with either especially purified isotopes of the reactive materials or preferably, with common isotopes of commercially available materials.

Apparatus for producing high temperatures, constructed in accordance with the broader aspects of the invention, comprises means for developing a concentrated magnetic field substantially encompassing a reaction space, and means for producing a cloud or plasma of ions in the reaction space in the presence of the magnetic field.

The invention is based on three well-known facts:

First, gases become ionized on heating, and can be completely ionized at even moderately high temperatures, the heated gas resolving itself into a cloud or plasma of electrons and positively charged ions;

Second, the temperature of a heated gas is defined by the average kinetic energy of its component particles;

Third, a charged particle entering a magnetic field transversely will be deflected by that field from its straight line course into a circular path, while such a particle traveling longitudinally of the field will be undeflected.

In accordance with the invention, means are provided for establishing a localized and very intense magnetic field which substantially surrounds or encompasses a reaction space containing a small volume of gas to be heated, this volume being most conveniently a small portion of a larger surrounding body of gas. The small volume mentioned is heated and ionized, preferably by passing an electric discharge such as a spark through the reaction space in a direction along a plane or axis of symmetry of the field which encloses it. To the extent permitted by the enclosing field, the thermal velocities imparted to the gas ions are random, tending to cause them to escape from the heated zone, but since the particles are all charged they are immediately deflected by the surrounding field and forced back into the path of the spark, and are thereby prevented from escaping into the surrounding body of gas to heat it by convection or from hitting the walls of the container or other adjacent structure to impart their energy to the latter as heat lost by conduction. The temperature to which the gas within this small volume can be raised is herefore limited only by the strength of the magnetic field, which determines the maximum energy of the particles which can be so deflected as to return toward the heated zone before escaping or striking the surrounding structure, and by the kinetic energy which can be applied to the ions in the heated zone by the spark.

In an exemplary form of the apparatus, the magnetic field which surrounds the volume of gas to be heated is developed by passing current through an inductance coil structure comprising a pair of similar, coaxially arranged coils which have a small internal diameter as compared with the width of the conductor in each coil as a whole. The two coils are spaced along the common axis by a distance which is of the same order of magnitude as and is preferably approximately equal to their internal diameter, the space defined by the internal diameter of the coils and the dimension of the interspace between them comprising the aforementioned reaction space containing the body of gas to be heated. The coils are connected so that they will carry substantially and preferably exactly the same current at the same time; i.e., they may be connected either in series or in parallel but the former is preferred as requiring less careful balancing to make the coils electrically identical. Each of the two coils may comprise a single edgewise turn of strip material whose leads are brought out face-to-face to minimize the lead inductance. Current may circulate through the coils either in the same or in opposite directions, each of these arrangements having certain advantages.

If the circulation is opposite, so that the fields produced thereby are oppositely directed along the common axis of the coils, a space is produced midway between the coils which is substantially field-free, the lines of force from both fields combining to pass out radially between the coils as a field of radially decreasing strength. Means are provided for passing through these coils pulses of current which may be of a duration of time less than a microsecond up to and including pulses of 100 microseconds and even longer each, depending upon the configuration of the apparatus used. With a single coil of this character, extremely powerful magnetic fields can be established at the center of the coil. With the two coils bucking, the inductance of the system is still further reduced so that even stronger fields can be developed. Even with a single coil, field strengths up to ten million ($10^7$) gauss have been established and maintained for periods of the order mentioned.

A pair of electrodes is mounted axially of the two coils, forming a spark gap which spans the interspace between them, and means are provided for establishing a pulse of energy of sufficient voltage to jump this gap during the passage of the current pulse through the two coils.

If the purpose of the arrangement is to examine the spectrum of air at ultra-high temperatures no further apparatus is required. In general, it will be other materials whose examination or treatment is necessary or desirable. In this case the arrangement described will be enclosed within a gas-tight container, preferably provided with exhaust ports for first removing the air and pressure ports for introducing the gas or gases whose temperature is to be raised. In this event a window may also be provided, through which the volume of incandescent gas can be observed.

To induce controlled thermo-nuclear fusion, the reaction space is permeated with one or more of the aforementioned nuclear reactants and the magnetic field must be of megagauss intensity, i.e., in excess of one million gauss, and preferably of the highest intensity obtainable. Moreover, the energy supplied to each particle of the reactant within the reaction space encompassed by the magnetic field must be at least several orders of magnitude greater than the quantum threshold for ionization of the particles. As before, the magnetic field may be co-directional or it may comprise two co-linear, oppositely directed fields of the intensities described, closely apposed, in which case there will be formed on the common axis between them a small volume which is relatively field-free owing to the mutual repulsion of the lines of force constituting them. The energy required to initiate the reaction may be supplied by an electric spark passed through the gas contained in the reaction space and enclosed by the field, in the direction along the axis of the magnetic field. Where co-directional fields are employed, it is only with great difficulty that a spark can pass or that charged particles, either electrons or nuclei, can traverse the space in any direction other than the axial direction of the field; if oppositely directed fields are employed, the spark may be readily passed either in the axial direction or in a transverse direction midway between the two coils. The passage of the spark dissociates, ionizes, and heats the gas, so that the particles comprising the gas acquire high energies which tend to cause them to escape from the area of the discharge. Owing to the fact that they are necessarily all ionized, the particles cannot penetrate the field but are deflected back into the region wherein the spark is passing, in their motion themselves setting up magnetic fields which tend to render the space through which the spark is actually passing field-free, while concurrently increasing the magnetic field density in the surrounding region. The encompassing magnetic field therefore acts as a highly elastic membrane, expansible to a limited degree but becoming increasingly rigid as it expands.

Un-ionized atoms of the surrounding gaseous atmosphere can enter freely through this magnetic wall or membrane, since, being uncharged, they are not deflected by the magnetic field. Once having entered the reaction space, however, they are immediately ionized and cannot escape and hence the "membrane" acts like one of the semi-permeable type.

It should be readily apparent that as long as the field persists, practically no energy can be lost by either conduction or convection. As soon as the field is permitted to collapse, however, the highly energetic ions immediately escape into the much larger surrounding volume of gas, which is thereby raised to a temperature which is a measure of the average thermal energy of the entire volume of gas including that in the reaction space. This is the weighted average of the absolute temperatures of the two volumes, and by choosing a suitable volume for the container or reaction chamber the temperature of the entire gas volume can readily be controlled and held within feasible limits. It is this temperature, and not the temperature of the actual reaction space that determines the temperature rise in the reaction chamber as a whole.

Those portions of the reaction chamber which are necessarily close to the reaction volume will, of course, have their surfaces raised to a much higher temperature. The rate of thermal conduction in the metals which would normally be used is, however, relatively slow, so that the penetration of the heat waves in the intervals between reactions is not great, the gas is expanding and cooling as it is released, and much of the energy absorbed by the surfaces close to the reaction volume is returned to the gas. More is conducted away and the parts of the equipment closest to the reaction can be water-cooled if necessary.

The final problem is that of withstanding the forces involved. As has been pointed out, no materials now known could directly support these forces. The forces resulting from the pressure within the reaction volume are transferred to the coils which carry the currents generating the magnetic field through the medium of the field itself. What withstands these forces is the inertia of the coils and of the other parts of the structure wherein the reaction takes place. The parts can do this because of the very short intervals during which the field is maintained, and although the forces acting are very large their impulse, in a period of the order of microseconds, is not excessive. Therefore the reaction can be contained within chambers of readily realizable physical size and strength.

From the above, it will, of course, be recognized that the invention is dependent upon the effective use of pulse techniques. By liberating large amounts of energy during very short intervals and so spacing those intervals that the recurrence time is long in comparison with the portion thereof during which energy is released, the average can be made of manageable proportions and the problems of strength, heat loss, and related matters can be solved by fairly conventional techniques. Indicative of the usefulness of the device as a power source, it should be quite evident that the reaction chamber can be made one unit of a closed circulatory system for the hydrogen isotope used as one of the reactants. With this arrangement the over-all system can become a "hot gas generator," the energy of the reaction transferred through a heat exchanger and used in any manner desired, and the cooled gas returned to the system for further reaction. The very high specific heat of hydrogen and its isotopes is favorable to such use.

Furthermore the method and apparatus are useful as providing an extremely prolific neutron source if the proper nuclear reactants are used. Such neutron generation (and power generation as well) is possible using the generally available forms of the reactive substances. For example, hydrogen isotopes will react with lithium or with each other to produce a plentiful supply of neutrons plus power. The lithium can be introduced into the reaction area by coating one or both of the electrodes, through which the spark is introduced into the system, with lithium or one of its salts, preferably lithium deuteride, or the sparking electrode can be provided with a lithium core. The heat of the spark evaporates the coating material into the reaction space, and if the salt is used it is dissociated into deuterons and lithium nuclei both of which are capable of entering into the fusion reaction.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 8 is a vertical cross-sectional view of a modified form of the device;

FIGURE 9 is a cross-sectional view, in plan, of the device illustrated in FIGURE 8;

FIGURE 10 is a developed view of the coils employed in the apparatus of FIGURES 8 and 9, as used for parallel excitation with the fields aiding;

FIGURE 11 is a generally similar developed view of the coil construction for use in the apparatus of FIGURES 8 and 9 with the coils connected in series and the fields bucking;

Figures 1, 2:
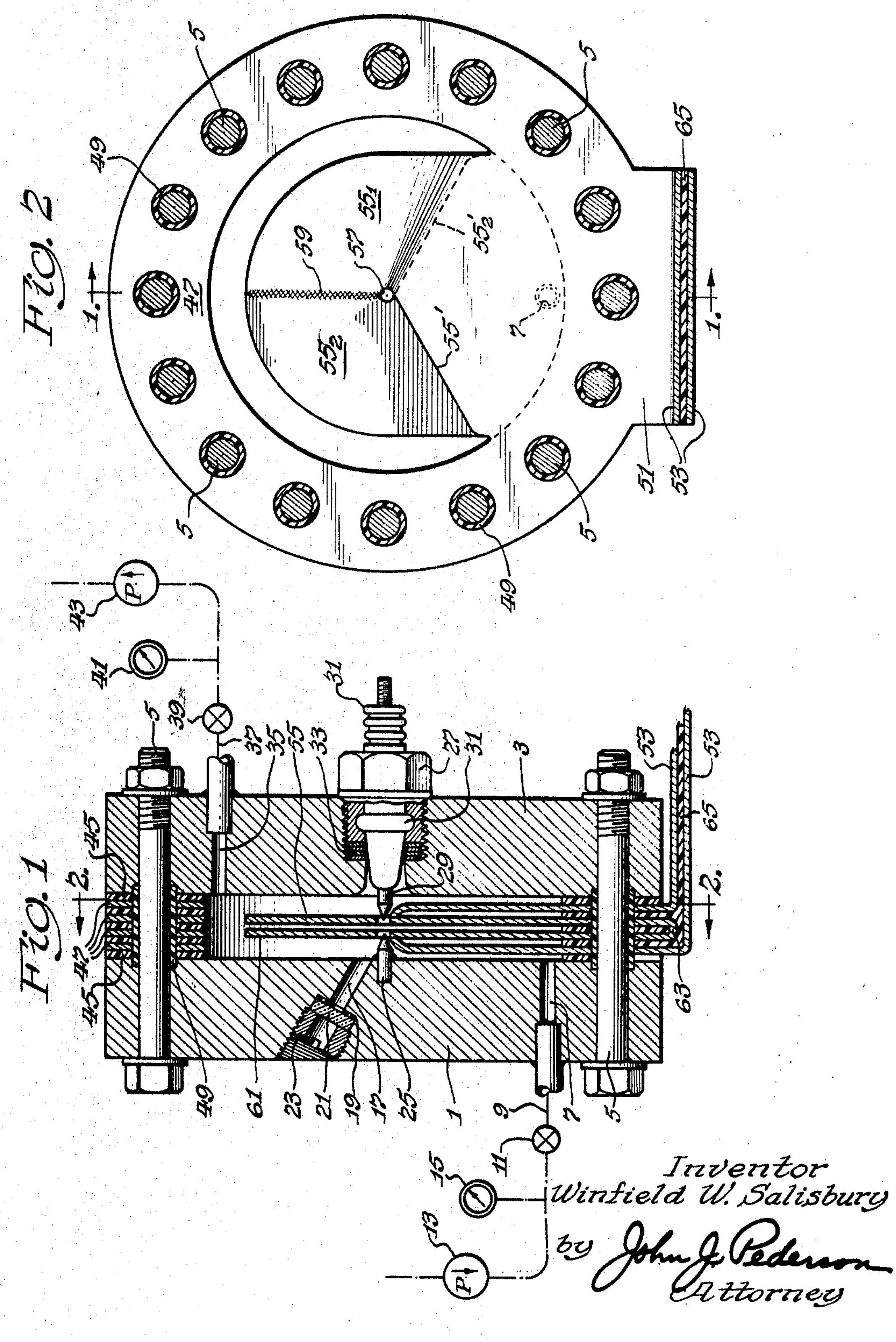
FIGURE 1 is a diametric cross-section of an illustrative embodiment of the device, the connections to an exhaust and to a pressure system being shown schematically.
FIGURE 2 is a cross-sectional view of the device of FIGURE 1, the plane of section being indicated by the dashed line 2—2 in the first figure.
Figures 13, 14, 15:
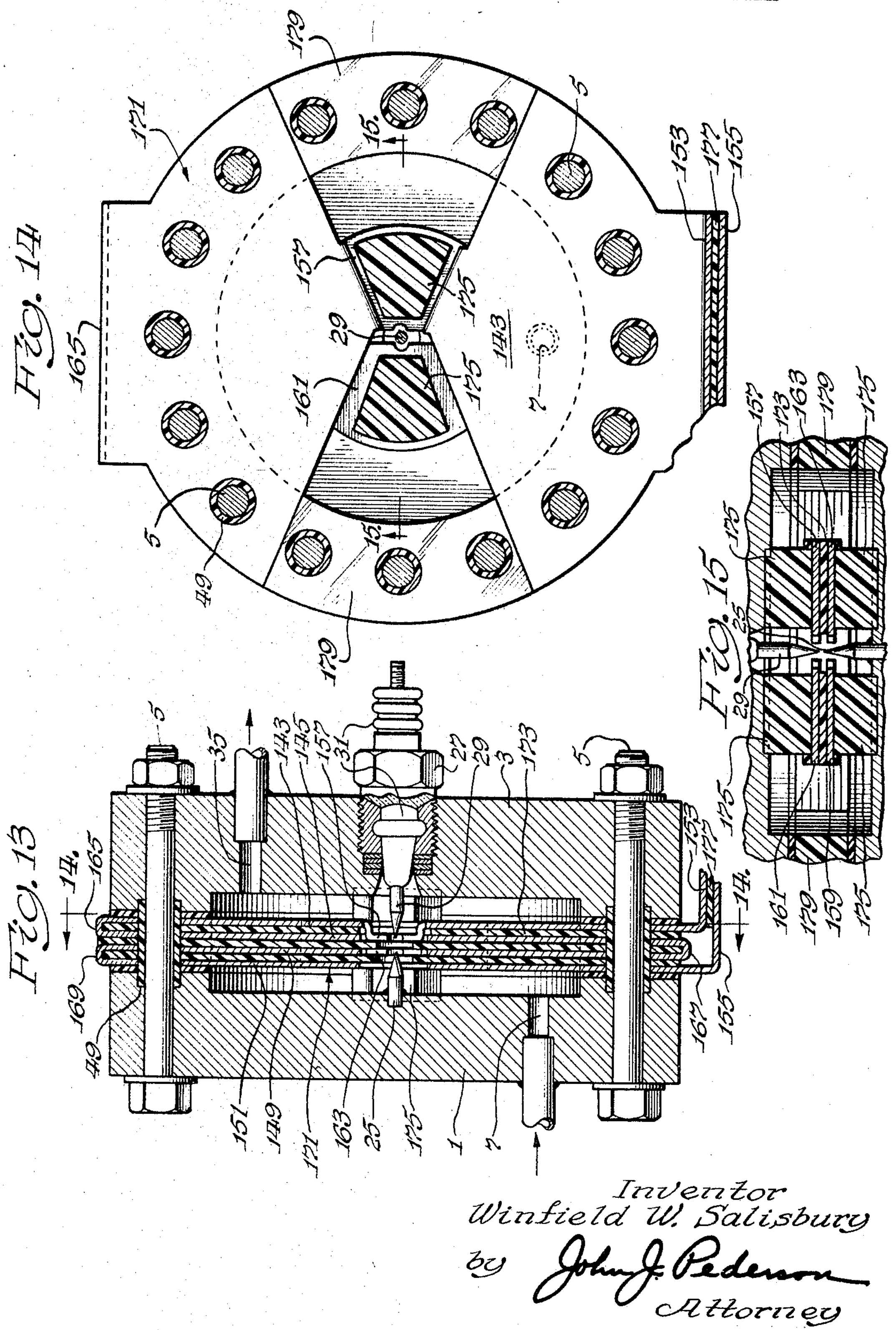
FIGURE 13 is a cross-sectional view, similar to that of FIGURE 1, of an embodiment of the invention incorporating the inductance coil structure of FIGURE 12.
FIGURE 14 is a cross-sectional view, taken along the line 14—14 of FIGURE 13.
FIGURE 15 is a cross-sectional view taken along the line 15—15 of FIGURE 14.
Figure 17:
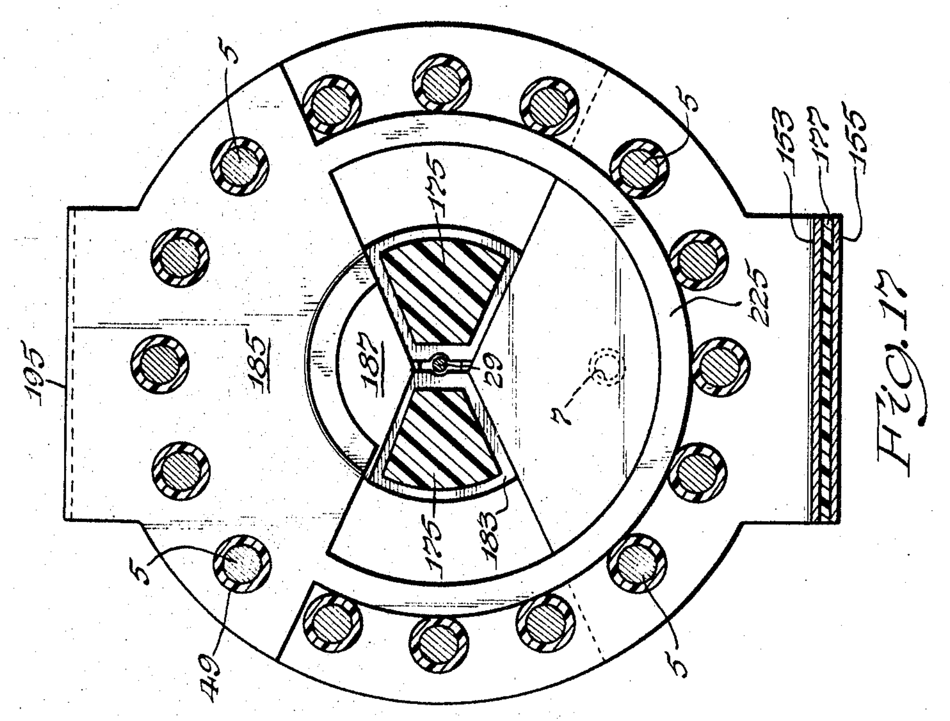
FIGURE 17 is a cross-sectional view taken along the line 17—17 of FIGURE 16.
Figure 16:
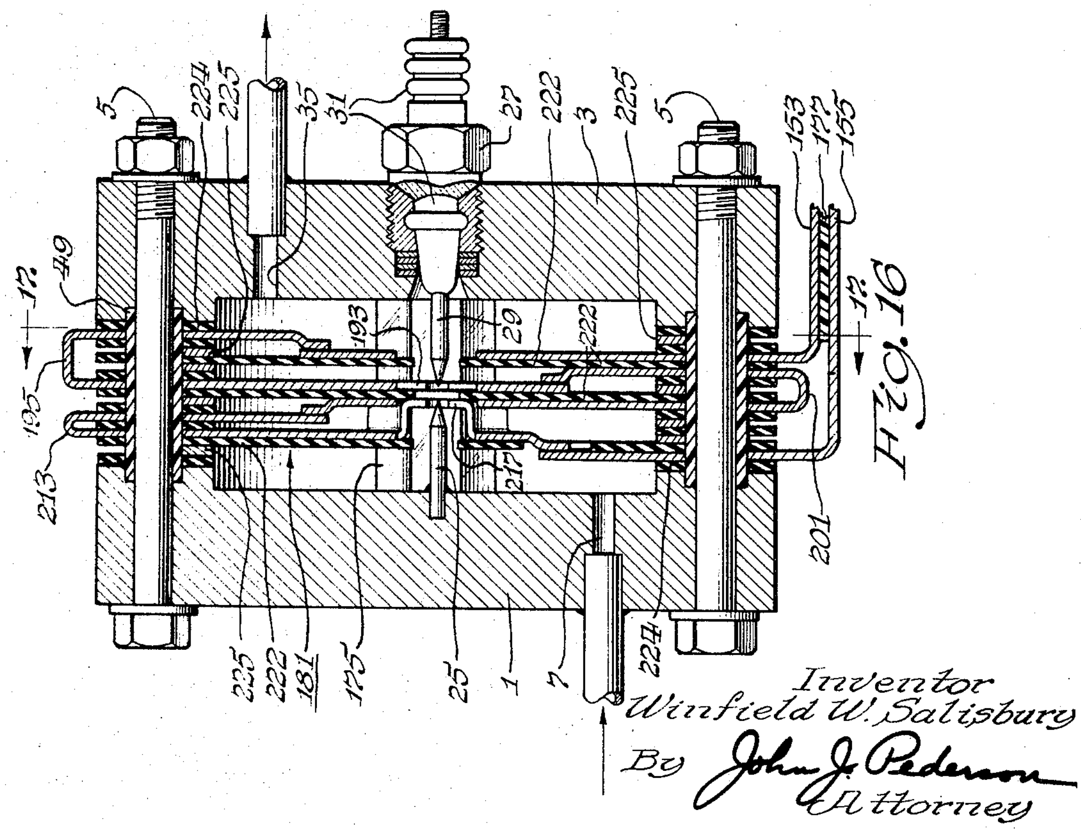
FIGURE 16 is a cross-sectional view, similar to those of FIGURES 1 and 13, of an additional embodiment of the invention.
Figure 18A:
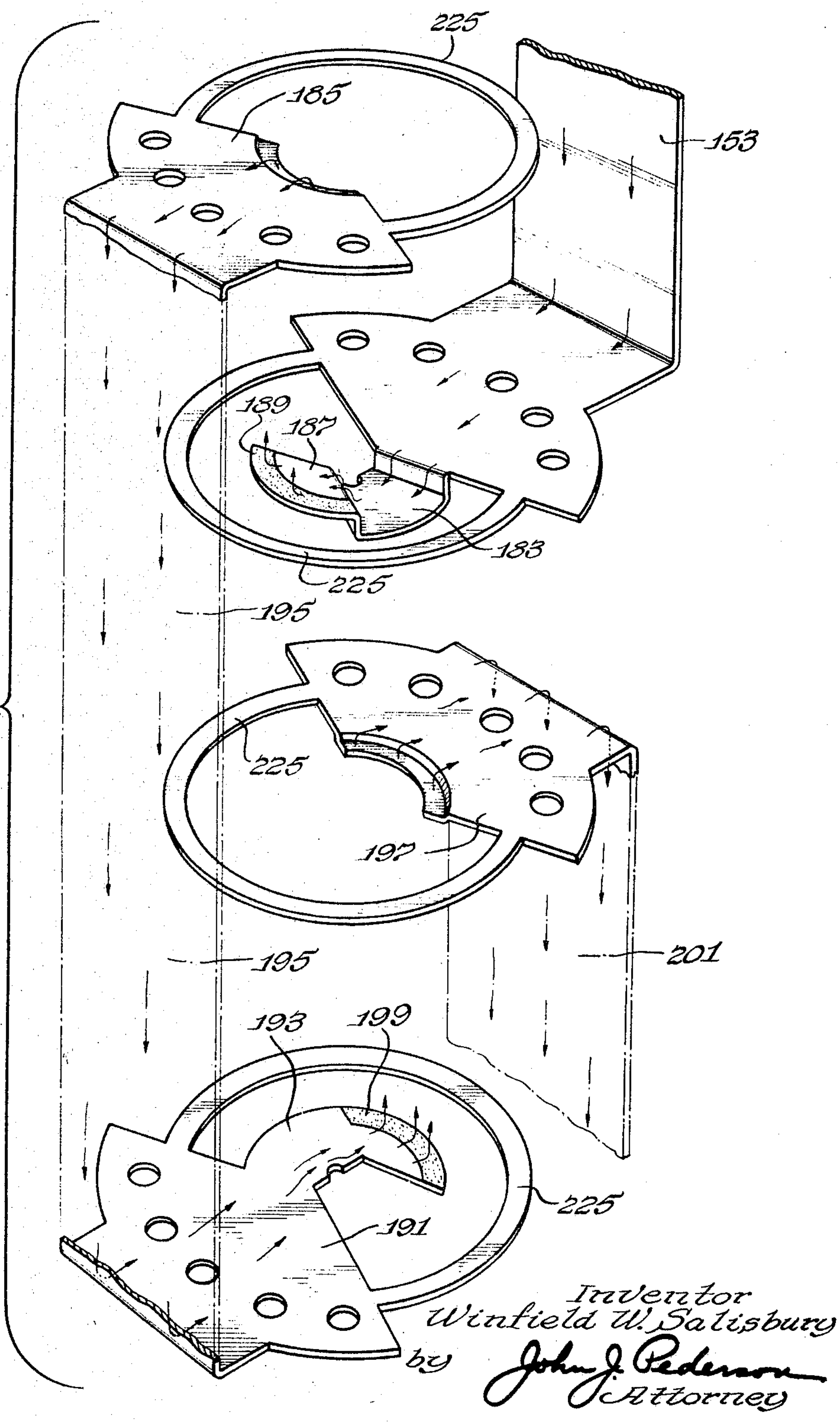
Figure 18B:
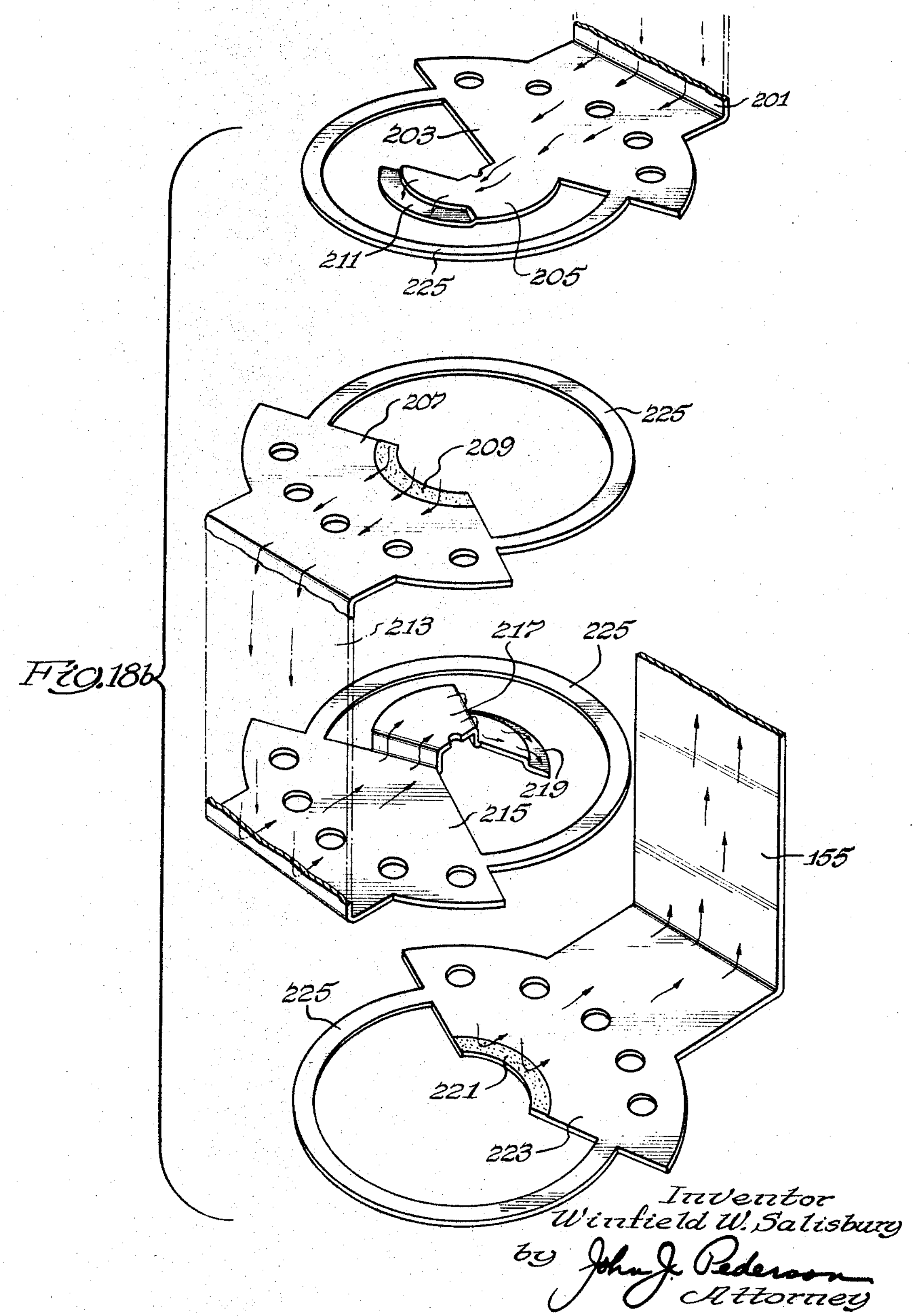
Figures 19, 20, 21:
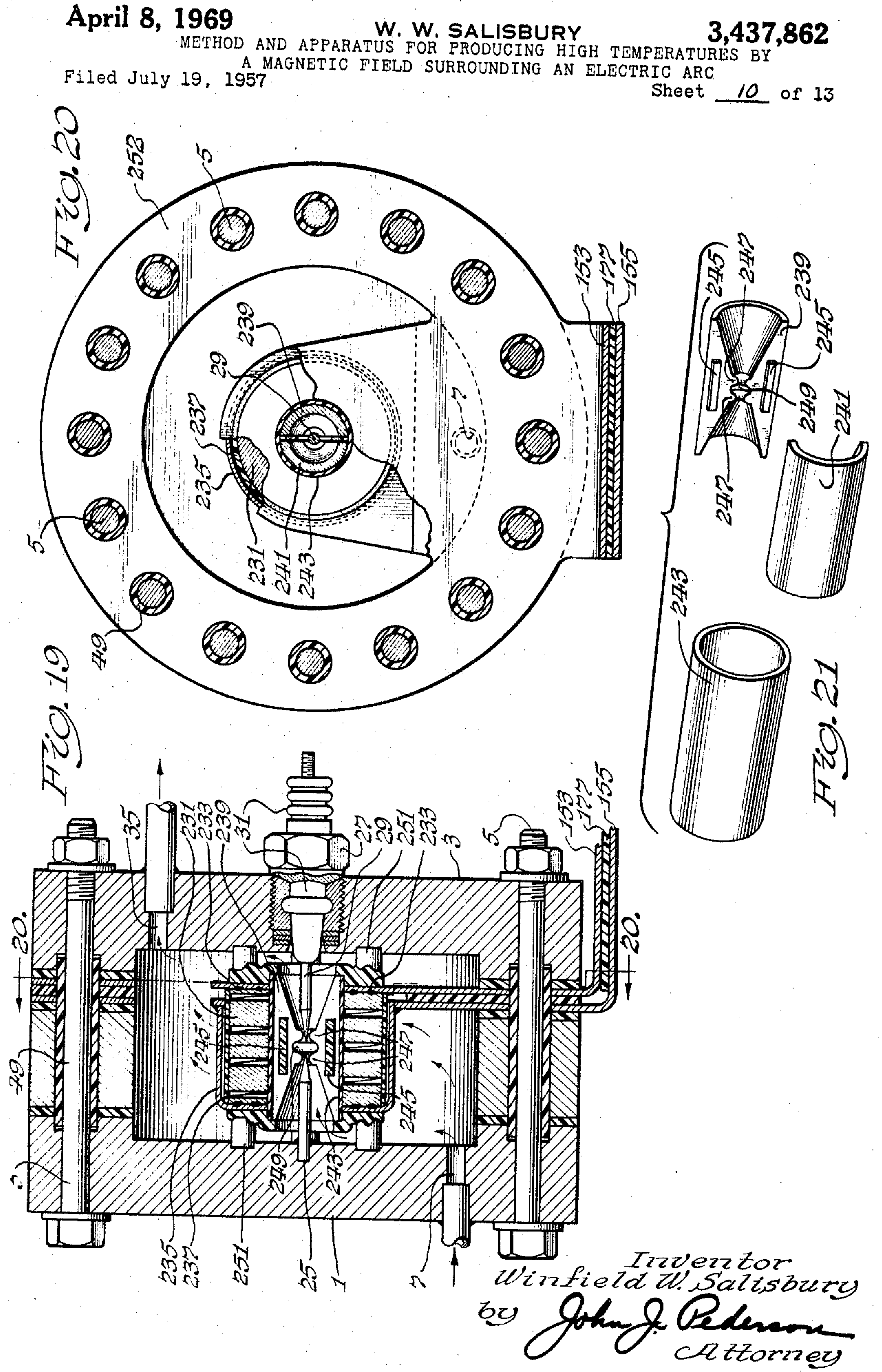
Figure 25:
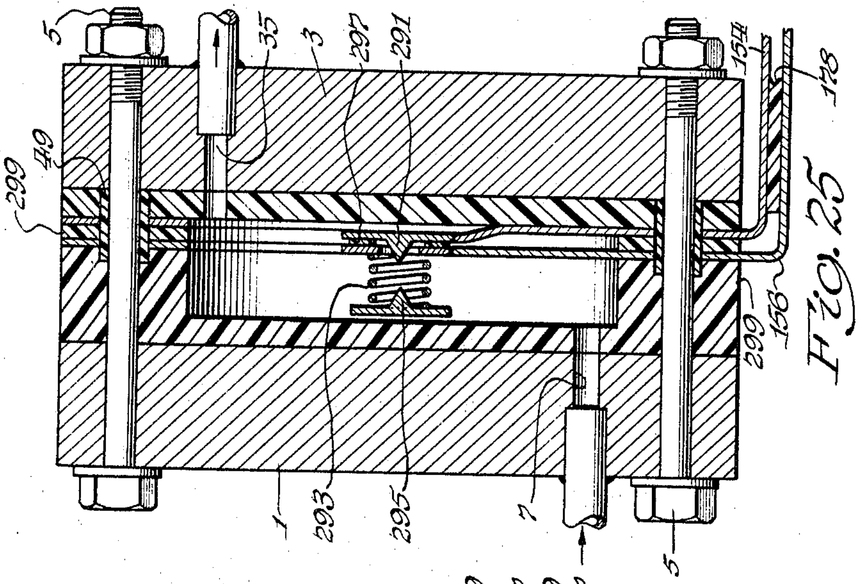
Figure 22:
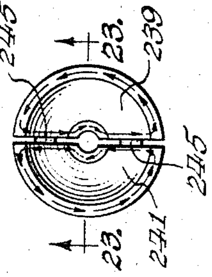
Figure 23:
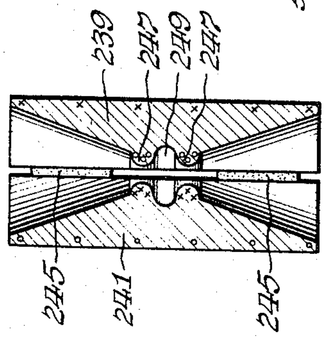
Figure 24:
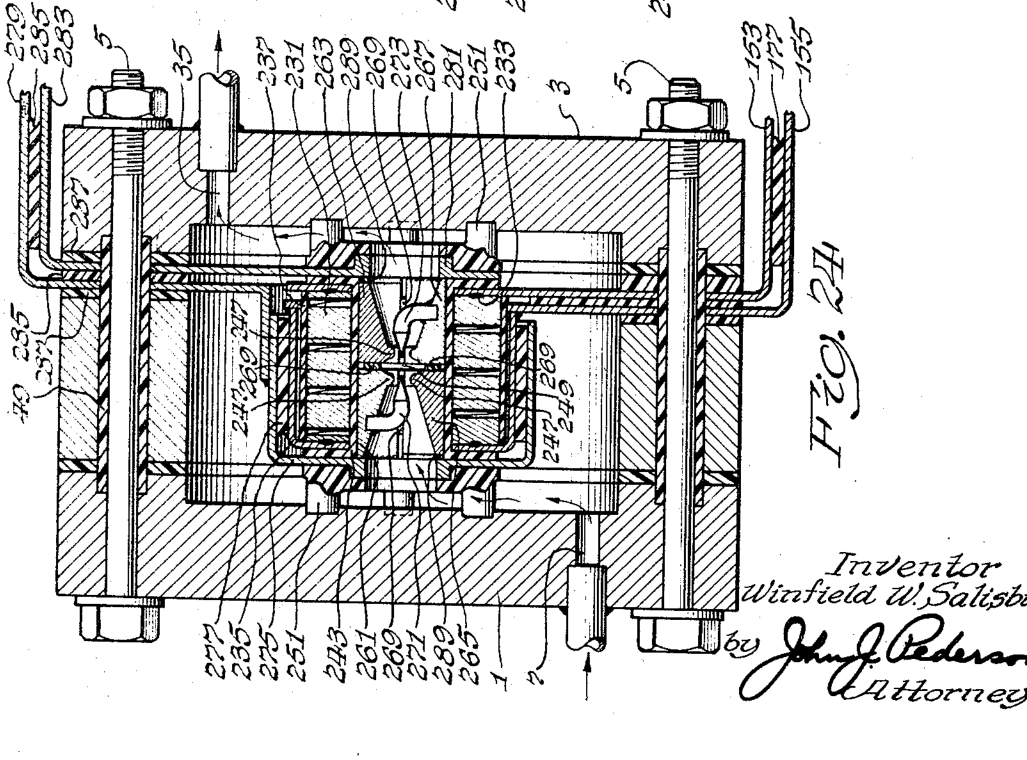
Figure 26:
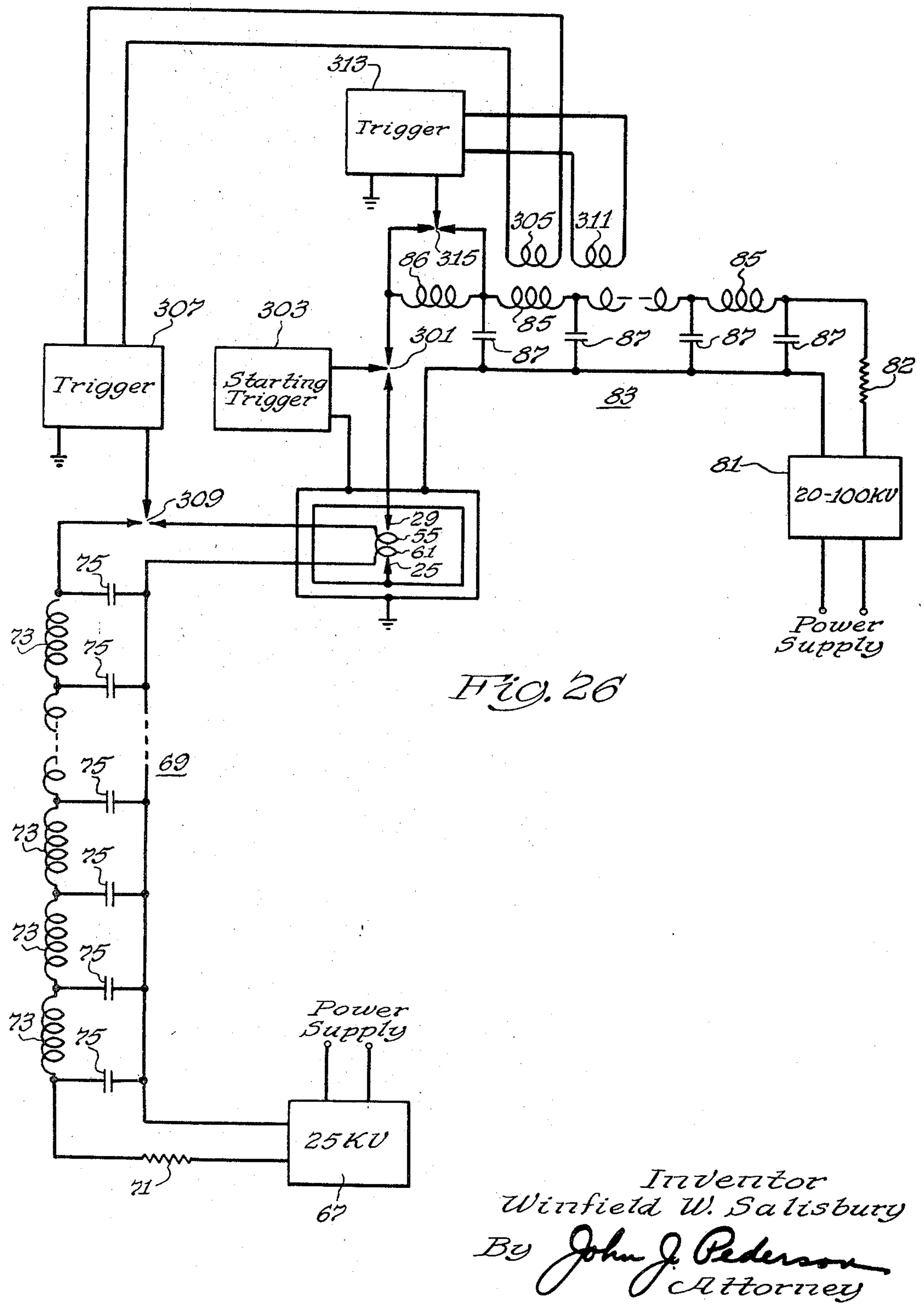
Figures 27, 28, 29:
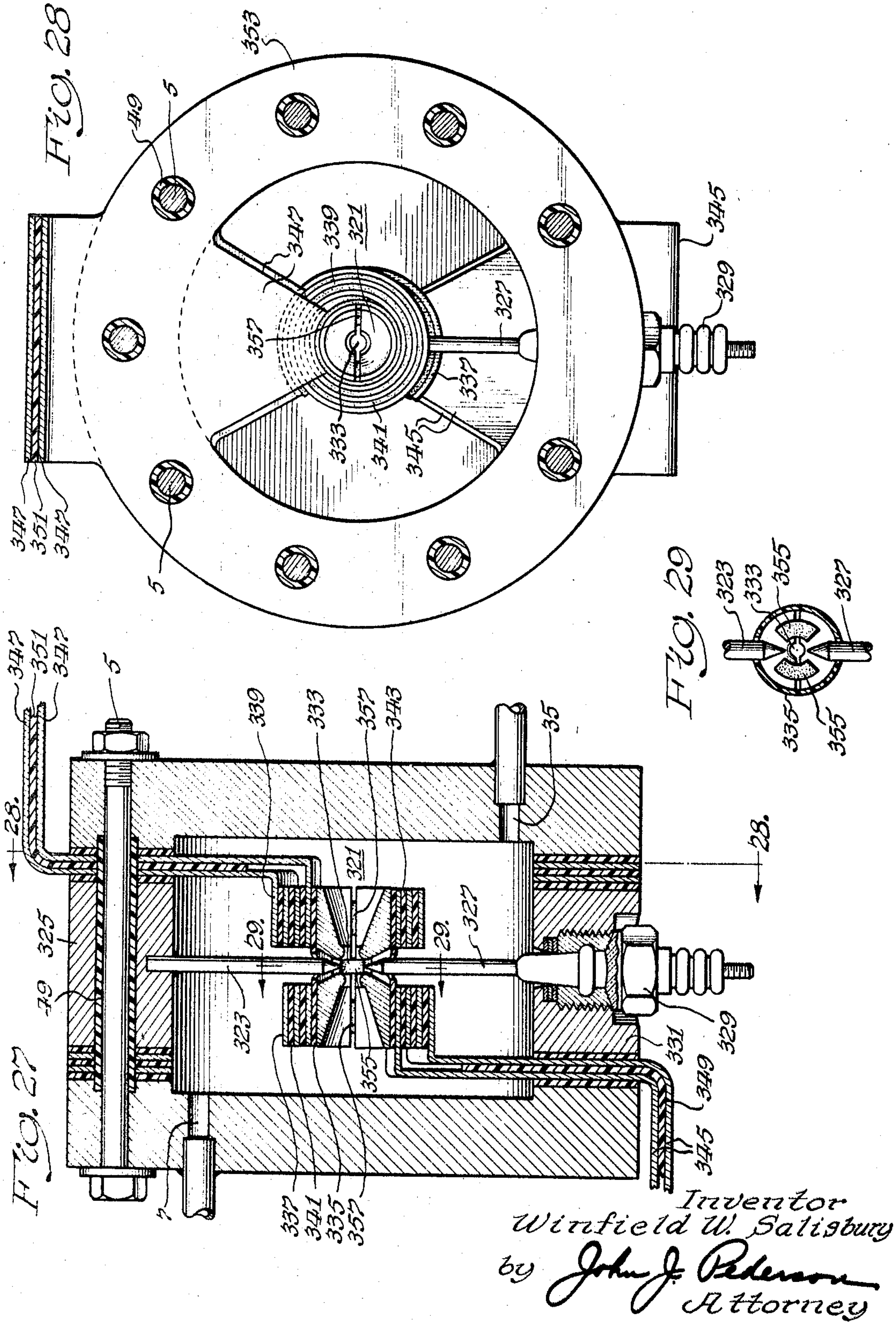

FIGURES 18*a* and 18*b* together constitute an exploded view of the inductance coil structure employed in the embodiment of FIGURES 16 and 17;

FIGURE 19 is a cross-sectional view, similar to those of FIGURES 1, 13 and 16 of still another embodiment of the invention;

FIGURE 20 is a cross-sectional view, taken along line 20—20 of FIGURE 19;

FIGURE 21 is an exploded perspective view of a portion of the inductance coil structure of the embodiment of FIGURES 19 and 20;

FIGURE 22 is an end view of the structure shown in FIGURE 21;

FIGURE 23 is a cross-sectional view, taken along the line 23—23 of FIGURE 22;

FIGURE 24 is a cross-sectional view, similar to those of FIGURES 1, 13, 16 and 19, of a further embodiment of the invention;

FIGURE 25 is a cross-sectional view of still another embodiment of the invention;

FIGURE 26 is a schematic circuit diagram of a power supply system which may be employed with any of the illustrated embodiments in accordance with another aspect of the invention;

FIGURE 27 is a cross-sectional view of a further embodiment of the invention;

FIGURE 28 is a cross-sectional view, taken along the line 28—28 of FIGURE 27; and FIGURE 29 is a cross-sectional view, taken along the line 29—29 of FIGURE 27.

In the form of the invention illustrated in FIGURES 1 and 2, the container which houses the active elements of the apparatus comprises primarily a pair of heavy metal discs 1 and 3 which are preferably formed of a material which is resistant to attack by either the gas to be heated or by any reaction products which may be formed in the operation of the device. For many purposes stainless steel is suitable, and it is of some advantage to use one of the grades of this material which is substantially non-magnetic. As will be understood from the general description of the apparatus above given, there will be extremely intense magnetic fields in the immediate neighborhood of the container and it is, of course, desirable to minimize the losses due to the electrical or magnetic induction in the container. Because of the brief duration of the pulses employed in operating the device, both electric and magnetic effects come into play and losses may be reduced by making the surface of the material either highly resistant or highly conductive. For the later purpose plating the inner surface of the discs with gold, silver or copper is effective where these materials have the necessary chemically non-reacting characteristics. Where such a plating is restored to, its effect is to reduce somewhat the effective inductance of the coils, which is desirable; in any event the losses are of relatively small moment in comparison with the total amount of power utilized in the operation of the apparatus.

A circle of holes is formed near the periphery of both of the discs for receiving stud bolts 5, which clamp the container together. Disc 1 is provided with a port 7 for attachment to a pressure system including a duct 9 having a control valve 11 therein for admitting the gas to be treated. The duct can connect to a gas cylinder 13 or other source of gas under pressure, and the system is shown as being provided with a pressure gauge 15.

The disc 1 is also shown as being provided with a window for observing the area wherein the heating is taking place. This window is shown as comprising a bore 17 which aims diagonally through the disc at the sparking area and is counter-bored and threaded to receive a gasket washer 19, of copper or other soft metal, upon which rests a heavy disc of quartz or glass 21 held tightly in place against the gasket by a hollow screw 23. For many purposes a synthetic plastic such as the fluorine-substitution plastic, polytetrafluoroethylene, manufactured and sold under the trademark "Teflon" forms a suitable gasket material. A fixed spark electrode 25 projects inwardly of the container from the center of disc 1.

The disc 3 is formed with a central aperture which is counter-bored and threaded to receive a spark plug 27, whose central conductor 29 faces the electrode 25 to form the spark gap through which is delivered the energy which heats the gas to be treated. The spark plug can be of substantially the type used in automative practice, the conductor 29 being surrounded by an insulating sleeve 31 of ceramic, mica or other suitable insulation. Gaskets or shims 33 provide a seal against the gas pressures developed with in the container. It may be noted that when the device is operated at the higher internal gas pressures that will be referred to later, requiring high voltages in order to strike the spark, additional insulation must be provided externally of the apparatus for the lead to the spark point or electrode 29. Because this is not directly pertinent to the invention, such additional insulation is not shown in the figure. An exhaust port 35 connects with a suitable vacuum line 37, closed off by a valve 39 and provided with a vacuum gauge 41, which leads to a vacuum pump 43.

The circumferential walls of the container are built up from conductive rings 47, formed integrally with the magnetic coils themselves, alternating with rings 45, of insulating material, separating the coils. In the modification of the method first to be described the coils are arranged to establish coaxial but oppositely directed magnetic fields, the exciting currents therefore circulating through the two coils in opposite directions. Each coil is formed from two flat plates, preferably of copper, although they may be of steel (for rigidity) copper plated to carry the current. Because of the short duration of the pulses used the major portion of the current is carried by the surface layers of the coils in any event, owing to skin effect. Tungsten, with or without copper plating is also a suitable material for the coils; it has great mechanical strength, fair conductivity, and its high density gives it high inertia to withstand the impulse of the large forces that are developed during the current pulses. For the high-temperature purposes for which this reaction chamber is intended, insulation rings 45 may be constructed of dense, refractory ceramic, sealed to the adjacent metal by a high-temperature cement.

Figure 3:
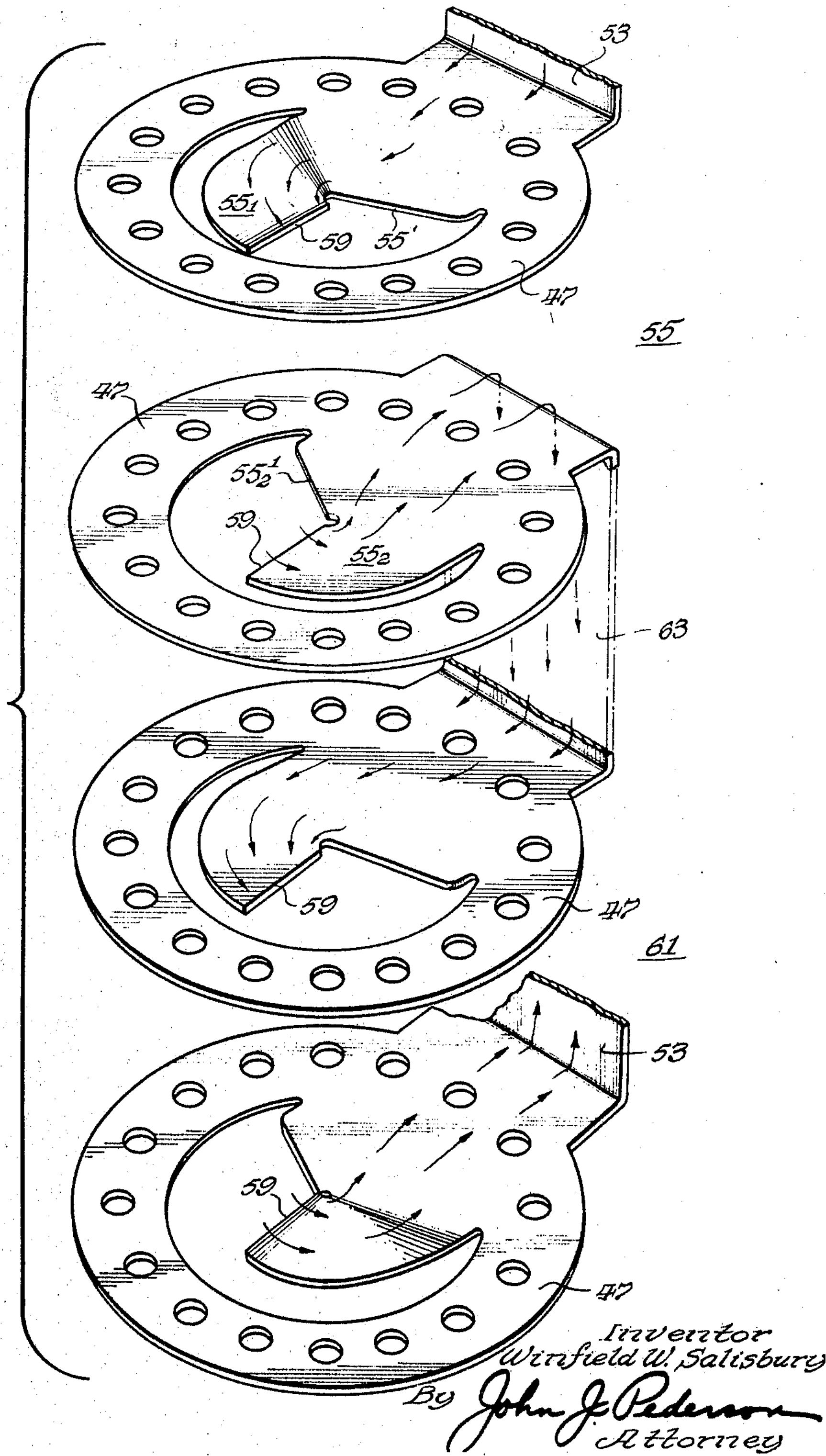
FIGURE 3 is an exploded perspective view of the coil assembly of the device of FIGURES 1 and 2.

The construction of the coils and the conductive rings 47 is best shown in FIGURES 2 and 3. Each coil is formed in two halves, of very nearly the same shape, which are brazed, soldered, or welded together to form a single turn. Each of the component parts of the coil comprises a ring 47 of the same outside diameter as the discs 1 and 3, this ring being perforated around its circumference to pass the clamp bolts 5 and an insulating sleeve 49 which surrounds each bolt. Projecting outwardly from one side of the ring is a tab 51 which is electrically and preferably physically continuous with a strip supply lead 53. Designating the entire upper coil (as viewed in FIGURE 2) by the reference character 55, the inwardly projecting tongue $55_1$ of the half which is fully visible in the figure extends from the full line 55' in a counter-clockwise direction, around one half of the minute circular aperture 57 which forms the internal diameter of the coil, to the line 59 where it is brazed or soldered to the other half of the coil. The other half of the coil 55 has a tongue of nearly the same shape, but turned over side for side, the projecting tab which forms the half $55_2$ of the coil extending beneath the half $55_1$ from the dotted line $55'_2$ in a clockwise direction around to its junction with tab $55_1$ at the line 59. The two halves differ in that the half $55_1$ is bent downwardly at the general position of the line $55'_2$ into the plane of the other half of the coil.

The second coil 61 is formed in exactly the same fashion, but is turned over, with the inner or unbent conductors being joined externally of the container at their projecting tabs 51 by a short connecting link 63. Supply leads 53 connect to the outer conductors of the coils, overlying each other closely, with a layer 65 of insulation between them. Externally of the reaction chamber the insulation 65, which separates the leads, need not be refractory. It should, however, be low-loss and should have considerable mechanical strength.

Coils of this character are characterized by very large current-carrying capacity and very low inductance. The currents carried by adjacent coils are in opposite directions and therefore, insofar as the magnetic fields of the coils overlap, they are bucking, so that their mutual inductance subtracts from the self-inductance of the individual leads. In spite of the very considerable capacity between the leads, the rise-time of pulses in the coils can be made very short.

Extremely high magnetic fluxes can be developed in the small central apertures 57, fluxes up to $10^7$ gauss and more having been measured for short periods of the order of magnitude of those involved in the process here described. With fluxes of this order of magnitude developed in the neighborhood of the coils and their leads, it will be seen that very high repulsive forces exist which would tend to disrupt the apparatus if they continued for any protracted length of time. What prevents such disruption, as has already been indicated, is the inertia of the structures, which tend to acquire only low velocities because of the small impulse of the acting forces and the cushioning of these forces during the periods in which they are acting by the elasticity of the materials. Experience has shown that only moderate restraining forces are required to hold the leads together externally of the reaction chamber and that even in the experimental apparatus illustrated the inertia of the coils is sufficient to withstand the forces operative internally of the reaction chamber.

The construction of the coils can be more readily visualized from the perspective view of FIGURE 3.

Figures 4, 7:
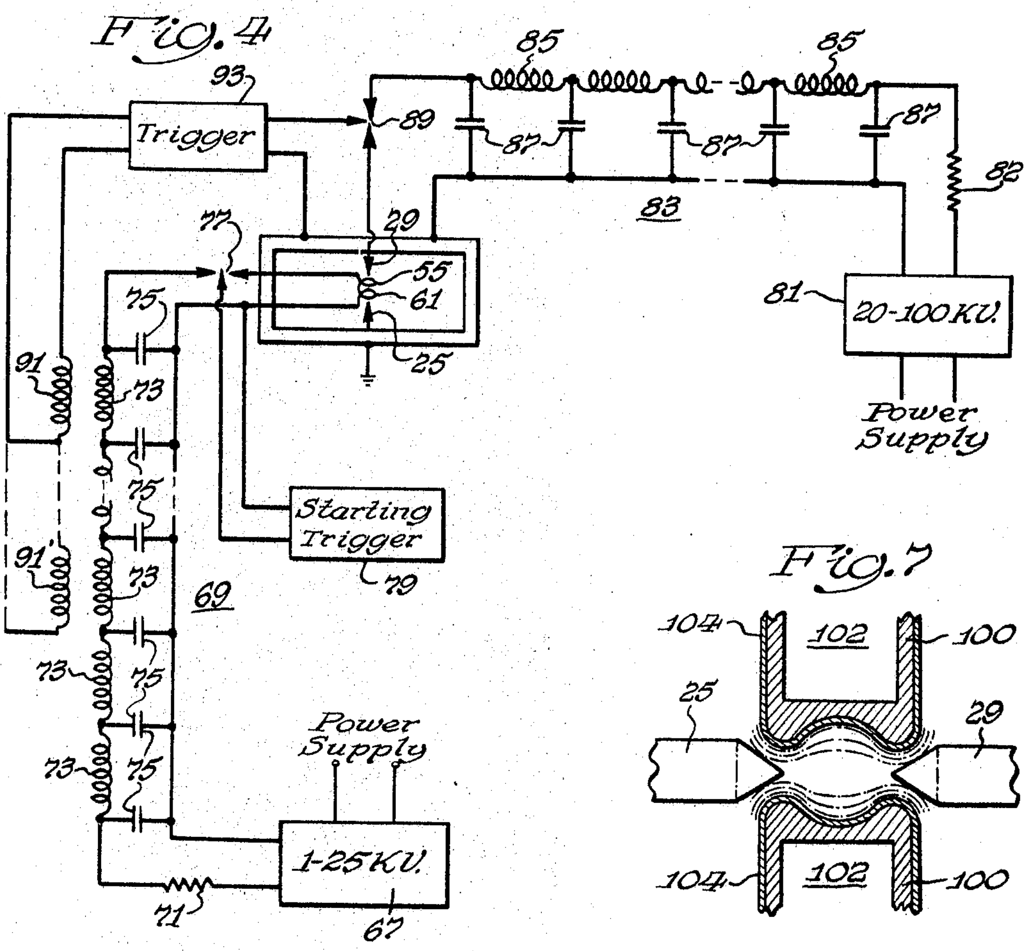
FIGURE 4 is a diagram, partly schematic and partly in block, of the electrical connections of the device.
FIGURE 7 is a view similar to those of FIGURES 5 and 6 of a modified construction for providing the desired field configuration with a single coil.

The connections for supplying power to the apparatus thus described are illustrated in FIGURE 4. These comprise means for developing a brief but intense pulse of current through the two coils and for further developing a voltage pulse, which will break down the spark-gap, while the current is flowing. There are several well known methods of developing such pulses, that shown being one conventional type which is suitable for the purpose. Power for developing the current pulse may be derived from an ordinary 60-cycle power line which feeds a rectifier power-supply 67, of substantially conventional type, to develop direct current at a potential of from 1 to 25 kilovolts, depending upon the duty to be imposed upon the system as a whole. The power-supply 67 connects to a pulse-forming network, generally designated by the reference character 69, through a current-limiting resistor 71. The network comprises series inductive elements 73 bridge by capacitors 75, in accordance with ordinary delay line practice, differing from the usual types of delay line only in that the capacitors are larger and the inductors smaller than would usually be used to give the required delay or pulse length of, say, 10 microseconds, in order to match the low impedance of the coils.

The line 69 connects to the coils 55 and 61 in series, through a spark-gap switch 77. This spark-gap can be fired by means of a starting trigger 79 which, by firing an auxiliary gap by adding a potential to that which is developed across the charged line, starts ionization in the main gap and thus initiates the main discharge. The use of such triggers is familiar in radar practice and in other utilizations of pulse techniques; the constructions of both the spark-switch and the triggering mechanism are conventional and therefore need not be described in detail. The trigger itself may be actuated at any desired repetition rate by a self-contained oscillator, an external oscillator, or it may be operated on the "one shot" principle by closing a manual switch.

The current in the coils 55, 61 depends upon the voltage to which the delay line 69 is charged and upon the effective impedance of the coils and their attached leads. Although the capacity between the leads is high, the impedance of the circuit through which the line discharges is largely inductive. Numerically, however, the inductance of the two coils is very small, even in terms of microhenries. Once the gap 77 is broken down its effective resistance is negligible and with substantially the full value of the voltage delivered by the power supply 67 effective across the inductance of the coils, discharge current pulses of many thousands of amperes can be maintained through the coils during the interval required to discharge the line. With short current pulses of the contemplated duration, the current is concentrated near the internal surfaces of the coils by skin effect and the magnetic field developed by a current of this magnitude is all forced through the very small internal diameter of the coils; using coils of this type fluxes have been developed and measured as high as 10 million ($10^7$) gauss at this location.

In order to cause the ionizing spark to jump the gap between electrodes 25 and 29 while this magnetic field persists, the discharge of the delay line 69 may be used to trigger the spark discharge. The latter is derived, preferably from the same power line as that feeding the rectifier power supply 67, through a similar high-voltage rectifier power supply 81, which, however, preferably operates at a higher voltage than the supply 67, i.e., at from 20 to 100 kilovolts. Supply 81 is coupled through a current-limiting resistor 82 to a delay-line 83 of the same general type as the line 69, including series inductors 85 and shunt capacitors 87. This line is designed to give a very slightly shorter discharge time than the line 69, say 9 microseconds if line 69 develops a 10-microsecond pulse. Line 83 connects to the spark gap within the container through a spark-switch 89, of the same type as the switch 77. This switch, however, is triggered by means of a pulse supplied through a coil 91 which is coupled to one of the coils 73, preferably that at the end of delay line 69 nearest its point of discharge. The initiation of the current pulse through the line 69 thus trips a trigger 93, generally similar to the trigger 79, and initiates a pulse which breaks down the gap 89 and initiates the discharge. The spark can, however, be triggered at a later epoch by coupling the coil 91 with one of the coils 73 which is located farther from the discharge end of the line, as indicated, for example, by the position of the coil 91'.

The pulsing may be triggered by any type of timing means which will start the spark after the magnetic field has reached a predetermined value, or, as hereinafter explained, it may be preferred in certain applications to ionize the gas in advance of the magnetic field pulse in which event the sparking pulse may be employed to trigger the current pulse through the coils. Suitable timing means may include multivibrators, oscillators with phase selecting circuits, as well as delay lines actuated by appropriately shaped pulses and other equivalent known circuitry.

The arrangement shown is designed to give substantially rectangular pulses of both voltage and current. This is desirable but not a necessary feature. The magnetic fields can build up gradually, as long as their build up is rapid enough to confine the ions at any given instant. For many purposes simple condenser discharges can be substituted for formed pulses, in either the magnetic-field generating circuit or the spark circuit. It is not even necessary that a DC spark be used; in most applications of the invention the primary function of the spark is to supply thermal energy to the magnetically-confined gas, and this can be accomplished by an oscillatory discharge as well as by direct current. The use of an oscillatory spark may even be of advantage in certain applications of the invention.

It will be realized that the circuit of FIGURE 4 is only one of several which may be used and which are, in general, well known. High-power pulsing circuits have become commonplace in connection with radar equipment and for this reason it is considered to be unnecessary to describe the trigger generators or the parameters used in the pulse forming networks in detail; reference may be made to standard works on radar pulsing circuits for detail omitted in the present description.

Figure 5:
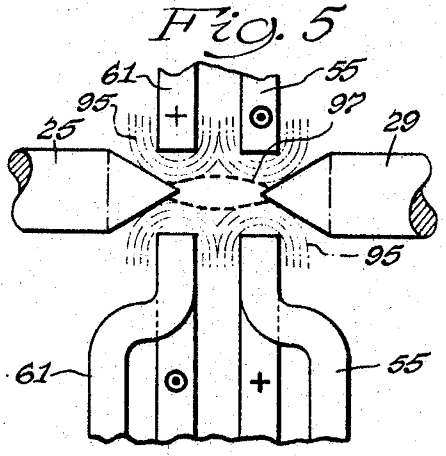
FIGURE 5 is a fragmentary view, on an enlarged scale, showing the general direction of the magnetic field in the vicinity of the spark-gap with the magnetizing coils connected to produce opposing fields.

The apparatus of FIGURES 1 and 2 has been shown with the coils 61 and 55 connected in series-opposing relationship as indicated in the enlarged fragmentary view of FIGURE 5, with the current direction in the two coils opposite, so that the lines of force in the reaction space defined by the diameter of the opening 57 and the space between the two coils have a polar axis of cylindrical symmetry and follow the paths as indicated generally by the light curved lines 95 within the gap. With this arrangement, it will be seen that there is a radial bulge in the flux lines near the median transverse plane of the field, thus defining a small, nearly field-free region, in the reaction space, on the axis of the coils and midway between them. The flux lines are substantially more concentrated near the axial ends of the reaction space than in the median transverse plane. The general direction of the electric field developed across the spark gap at the instant of the voltage pulse is indicated by the dotted lines 97 spanning the spark-gap. When the full voltage is developed across the gap, ions carrying the discharge can pass between the points, along the axis, without being deflected even by the very powerful field in the gap, while those which are not directed precisely along the axial direction will travel through spiral paths but with minimum deflection. Once the discharge is started, the gas in the substantially field-free reaction space at the center of the gap is quickly ionized and heated, the particles receiving energy which drives them at velocities depending upon their acquired energy and in directions which rapidly tend to become random. Because they are ionized and thus carry charges, they will, in general, upon entering the field surrounding the reaction space, be deflected and returned into the reaction space. This holds for all particles except those proceeding directly along the axis of the spark gap or those traveling in a transverse plane exactly at the center of the gap, where they can travel parallel to the radial magnetic field midway between the two coils. The proportion of the ions traveling in either of these directions is relatively small and very little energy escapes from the gap in this manner, particularly since repeated collisions constantly change the directions of the ions so that it is only those near the edge of the heated space which have reasonable probability of escape in the transverse direction. With fields of the magnitude which can readily be obtained with the mechanism here described, ions of the lighter gases having thermal energies as high as 10,000 electron volts will, in general, be returned to the reaction space, still retaining their thermal energy.

The effect of the deflection of the ions is to enlarge the field-free space, the magnetic fields developed by the moving particles adding to the field strength in the region between the particle and the coil which generates the field and subtracting from the field on the side of the ion path more distant from the coil. Therefore, although the reaction space may not have actually been field-free at the initiation of the discharge, it approaches this condition more nearly as time goes on and the number and velocity of the ions increases. Effectively the lines of force of the field through the coils are crowded closer to the coils themselves.

Since the ions cannot penetrate the magnetic field and strike the coils they do not lose energy to them. The points of the spark-gap are heated, as is the case with any spark, but the total number of ions which do strike the points is little greater than that which would be developed by a spark of the same voltage under ordinary conditions.

It is not essential to the invention that the coils 55 and 61 be so connected as to set up their magnetic fields in opposite directions. They can be connected in series-aiding relationship so that the fields "boost" instead of "buck," in which case the general configuration of the field in the vicinity of the spark, while also cylindrically symmetrical with respect to the common axis of the coils, will be that shown in FIGURE 6. Under such circumstances, the flux lines also have a radial bulge near the median transverse plane of the field and are substantially more concentrated near the axial ends of the reaction space than in the median transverse plane, but there is initially no field-free region on the reaction space, the ions have certain definitely preferred directions of motion, and immediate thermalization or randomness of direction does not occur. Some of the initial ions of the discharge, however, inevitably enter the magnetic field with components of motion transverse to the lines of force, and are thereby forced into spiral paths which crowd the field of the coils toward the coils and thus tend to form their own field-free space.

Figure 6:
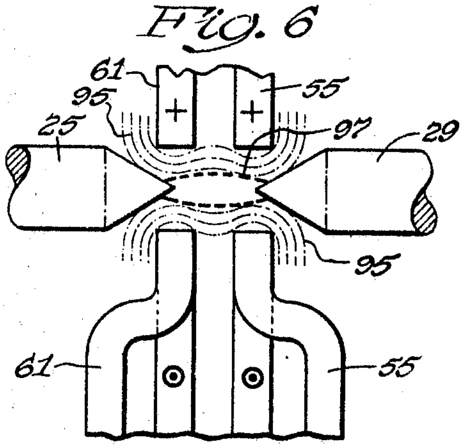
FIGURE 6 is a view generally similar to that of FIGURE 5 illustrating the general direction of the lines of magnetic force with the magnetic fields in the same direction.

It will be apparent that the arrangement of FIGURE 6 has the advantage that there is no escape path for the ions through the median plane between the two coils, but because of the very small proportion of the ions whose velocities are oriented in this plane and which are also in a position where they can escape before collision with other ions deflects them, the advantage is not of major importance. On the other hand, the configuration of FIGURE 5 gives the coil system a lower inductance than that of FIGURE 6, the mutual inductance between the coils being subtractive instead of additive, and therefore less power is required to establish a current pulse of the same value in the inductance coil structure of FIGURE 5 than in that of FIGURE 6. The power expended in the coil circuit does not go into heating the gas and therefore represents a loss.

FIGURE 7 illustrates how a field of similar configuration to that illustrated in FIGURE 6 may be generated by means of a single coil, in place of the dual coils shown in FIGURES 5 and 6. In this case the coil may be formed with a steel core 100, having within it a channel 102, wherein a coolant or energy-transfer fluid may be circulated. The core is preferably covered with a highly conductive layer 104, preferably of copper. The internal edges of the coil, surrounding the reaction space, are provided with a groove, leaving the central opening wherein the field is established smaller at its two edges than in the median line of the coil. Owing to the repulsion between the lines of force, this leaves a central space between the coil edges where the field is weaker than at the ends of the central aperture into which electrodes 25 and 29 project.

The mechanism by which the field contains the ionized gas, in each embodiment of the invention, is that a charged particle traversing the field is the equivalent of an electric current. A force is therefore exerted upon it, at right angles to both its direction of motion and the direction of the field, which deflects it in an approximately semi-circular orbit and returns it to the relatively field-free reaction space. The pressure of a gaseous medium is, of course, the force per unit area which it exerts against the surface containing it. It is proportional to the square of the average velocity of the particles striking the walls of the area, which, in turn, is proportional to their absolute temperature. The pressure is further proportional to the number of such particles and to their mass. Where the walls which contain the gas are the lines of force of a magnetic field the particles must penetrate the field deeply enough to have their velocity reversed.

In their motion the charged particles set up magnetic fields of their own in such sense as to decrease the field strength within their orbits and increase the field strength externally thereof, in effect crowding the lines of force of the initial field closer to the conductors carrying the exciting current. The number of lines of force lying between the original reaction space and the walls of the conductor is not changed by this process, with the result that the flux density is progressively increased and the constraining effect of the encompassing field increases accordingly.

Disregarding this crowding effect for the moment, and considering that the field surrounding the reaction space is homogeneous and constant, since force is the rate of change of energy with distance, the force per unit area which the field will withstand is numerically equal to the energy density. Therefore, where P is the pressure in dynes per square centimeter and B is the magnetic field strength in gauss:

$$P=B^2/8\pi$$

In order that the particles be subjected to this force, they must penetrate the field to a depth which depends on the field strength, and if they are to be returned to the reaction space so that they can actually be said to be contained, this depth must be fairly small in comparison to the dimensions of the reaction space itself. Still considering the case of a uniform, homogeneous field, the depths of penetration (i.e., the radii of curvature of the particle orbits) can be computed from the velocities corresponding to their temperatures and the field strength. For deuterium nuclei, these radii, at velocities corresponding to various temperatures and various field strengths, are tabulated below, the field B being in gauss, the temperatures T in degrees Kelvin and the radii $r$ in millimeters:

TABLE

| B (gauss) | T (degrees Kelvin) | $r$ (millimeters) |
|---|---|---|
| $10^6$ | $10^6$ | $1.4\times10^{-2}$ |
| $10^6$ | $10^7$ | $4\times10^{-2}$ |
| $10^6$ | $5\times10^7$ | $10^{-1}$ |
| $10^7$ | $10^6$ | $1.4\times10^{-3}$ |
| $10^7$ | $10^7$ | $4\times10^{-3}$ |
| $10^7$ | $5\times10^7$ | $10^{-2}$ |

It will be seen from above that a field of even $10^6$ gauss is sufficient to impart to the deuteron nuclei a radius of curvature sharp enough to return most of them into a reaction space corresponding to a one millimeter sphere even at a temperature of fifty million degrees Kelvin. With a field of $10^7$ gauss the radii of curvature are only $1/100$ millimeter and substantially all of the nuclei will be returned to a reaction space of this size.

Owing to the large number of charged particles contained in the reaction space and the crowding of the lines of force mentioned above, the fields will not be homogeneous. Within the reaction space there will be a zone of decreasing field strength, merging gradually into a zone of increased field strength. To a first approximation, if the initial field strength is high enough so that the number of lines of force between it and the conductors is sufficient to reverse the normal component of velocity and return the ions to the space at the maximum temperature to be contained, then as long as they do not exceed that temperature they can never reach the conductors.

From the above it will be seen that a field "encloses" or "encompasses" a reaction space if it will return ions to that space from which the field itself has been displaced. To at least a first approximation the ionized gas obeys the ordinary gas laws:

$$PV=RT$$

where P is the pressure, V is the volume, T the absolute temperature in degrees Kelvin, and R is a constant which depends upon the gas. That this is only a first approximation is due to fact that the composition of the gas changes as the action proceeds. Qualitatively, however, the gas tends to expand and crowd the lines of force as its temperature increases; in other words, the volume of the heated gas will increase slightly with the increase in size of the field-free space caused by ion deflection. This increase in volume may, however, be made up by the entry of additional molecules of un-ionized gas from the surrounding body, since such un-ionized particles can penetrate the magnetic field from any direction without deflection. Once they have entered and acquired energy by collision with the thermally agitated particles within the space, they too become ionized and cannot again escape. The magnetic field therefore acts as a semi-permeable membrane, and the pressure within the volume of heated gas can build up by a process comparable to osmosis.

The degree to which the reaction space can expand depends on the form of the apparatus used. With the apparatus of FIGURES 1 and 2 the field can be forced back into the interspace between the two coils, regardless of whether the coils are connected in bucking or boosting relationship. With the coil arrangement shown in FIGURE 7, however, the field cannot be forced back into the conductor and the expansion is therefore limited by the size of the groove within the coil periphery. Expansion of the reaction space results in a reduction of temperature, in accordance with the gas law as given above, and therefore somewhat higher temperatures may be attained with a single coil than with dual coils connected in either relationship shown.

It will thus be seen that during the period when the current pulse through the coils persists, the ionized particles cannot escape from the restraining field to carry away energy by convection or to strike the surrounding structure (with the exception of the spark points themselves) to cause any material loss of energy by conduction.

The pressure of the gas ions within the confined heated area is, of course, transferred to the coils through the mechanism of the crowding of the lines of force surrounding them, as has already been explained. There are, furthermore, powerful repulsive forces exerted against the coils because of the presence of the fields themselves. These forces are not effective to disrupt the apparatus because, in spite of their very large instantaneous value, they act so briefly that their impulse (i.e., force times time) is small and the inertia of the coils themselves is sufficient to absorb them, the forces vanishing before the relatively heavy structures have acquired a disruption velocity.

The moment the magnetic field collapses, the volume of gas which has been constrained by it is released. The gas is cooled in part by expansion, and in part by dilution with the unheated gas body surrounding it, to which it imparts a portion of its energy, raising the general energy level within the container while the originally heated particles cool. Some of the heated particles strike the conductors of the coils and raise their temperature, but because of the large mass of material in the coils as compared with the amount of material in the heated gas body the actual over-all rise of temperature from any individual discharge can be made very small. The discharge repetition rate can be so adjusted as to limit the over-all temperature rise of the apparatus to any desired value. The apparatus may be operated at an average temperature rise of a few hundred degrees centigrade, if desired, whereas the instantaneous temperatures achieved in the small bodies of gas instantaneously treated may, under certain conditions, be as high as 10 million ($10^7$) degrees Kelvin or even higher. The ultimate rise in temperature which can be obtained is greatest with materials of lowest atomic number and fewest orbital electrons. Hydrogen, as the material of lowest atomic number, is extremely transparent to the radiation which it emits at high temperatures and is a correspondingly poor radiator when heated. Even when raised to the maximum temperatures of which the apparatus is capable its loss of energy through radiation is extremely small and does not, in effect, set a limit to the temperatures which can be attained.

It should be apparent that if it is desired to react or to obtain the spectrum of a material which is not in the gaseous state at ordinary room temperatures, one of the electrodes, e.g., electrode 25, can be made of the material desired, or given a tip thereof.

Except for losses in the metallic circuit and in the gap 89, the power delivered from the supply 81 does go into thermal energy in the path of the spark. The energy expended in the gap is, of course, equal to the product of the gap current and the voltage across the gap. The discharge across the high pressure in the gap requires high voltage, particularly when the container as a whole is operated under pressure, and the amount of energy delivered to the heated gas in the short interval when the spark occurs can therefore be made very high while the losses in the circuit and in the switch gap 89 can be held at a very moderate value. As is generally true of pulse techniques, the instantaneous power delivered during the interval when the pulses are occurring may be extremely large while the average power is very moderate, the pulses being spaced by a time longer than their duration to conform with the ability of the apparatus to dissipate heat. This practice is quite familiar in radar operations.

FIGURES 8, 9 and 10 illustrate a modified construction which embodies the same principles as that already described and which may be advantageous for certain purposes. In this embodiment the container is generally cylindrical as in the first embodiment shown, but is considerably greater in length and smaller in diameter. It comprises a lower cap 101, an upper cap 103, and an intermediate section 105, the whole being held together by bolts 107 and the junctions between the sections being made gas-tight by suitable gaskets 109.

The central section comprises two roughly semi-cylindrical main parts $\mathbf{105_1}$ and $\mathbf{105_2}$. These parts are separated on one side by the flat leads 111 and 113 which support coils 115 and 115', these leads being separated by insulating strips 117. Diametrically across the section 105 from the point at which the leads are brought out is a spacer 119 flanked by gaskets 121, the spacers and gaskets occupying the same width as the leads and their insulation. The central section is held together by bolts 123, which are insulated from the leads, where they pass through them, in the same manner as the bolts 5 of the first described embodiment.

A developed view of coils 115, 115' and their leads, adapted to produce codirectional fields, is shown in FIGURE 10. In this case the two coils are connected in parallel. Coils and leads are formed from a single sheet of conductor, cut as shown. The two ends, forming the leads 111 and 113 respectively, are bent rearwardly at the points indicated by the dotted lines 125, through an angle of 90 degrees, and the coil portions 115 and 115' of the blank are then bent around in circular form as indicated by the double-headed arrow above the figure. This is the form of coil indicated in the sectional view of FIGURE 9. If oppositely-directed magnetic fields are desired with this embodiment of the invention, the coils can be formed of two similar blanks, each of the conformation illustrated by the solid lines in FIGURE 11. One of the two blanks is reversed, as indicated by the dotted line of the figure, and the parts are welded, soldered or brazed along the line 127. The bending is substantially the same as is the case with the arrangement of FIGURE 10, but since the right-hand end of the coil is not, in this case, supported by the container walls, holes 129, 129' are provided through which an insulated screw or rivet can be inserted to give rigidity. Since the two halves are now in series and are bent in the same direction, it is obvious that their fields will oppose. The arrangement is so similar to that shown in the sectional view that it should be unnecessary to describe or illustrate it further.

With either arrangement, the coil system is connected to the pulse-forming network 69 in exactly the same manner as in the embodiment illustrated in FIGURES 1 and 2.

A spark plug 133, similar to spark plug 31 of FIGURE 1 except that it has a long electrode 135 which extends axially through coil 115 into the interspace between the coils, passes through the cap 103. Similarly, a long electrode 137 extends upwardly from the lower cap 101 through coil 115'.

This particular arrangement has the advantage that the window 139, of the same general construction as the window used in the embodiment of FIGURE 1, provides a free and unobstructed view of the sparking area, and this form is therefore advantageous where spectroscopic analysis of the gas is the primary object. Pressure and exhaust systems can be attached to the container in the same manner as in FIGURE 1, but for simplicity they are omitted from the drawings, since their construction is conventional and obvious. Because of the construction of the coils of strap material, with leads carrying current in opposite directions closely opposed in all portions of the structure except the coils themselves, the inductance of the individual coils is approximately the same, for coils of the same internal diameter as the disc type coils of FIGURES 1 and 2. Considered together, the two coils are not as closely coupled as in the embodiment first described and therefore their mutual inductance is less; as a result the inductance of the circuit as a whole is slightly lower when the magnetic fields are in opposition and slightly higher when they are arranged so that they are in the same direction. For parallel operation, to provide the same strength of magnetic field, the current pulse supplied by the line 69 must have twice the amperage required for series operation of the coils but the voltage required is reduced to approximately one-half, discounting the impedance of the leads themselves which should, of course, be made very short in any event.

Theoretically it is immaterial whether the coils are connected in series or in parallel, but practically series operation has the slight advantage that precisely the same current flows in the two coils, whereas in parallel operation numerically slight differences in impedance may make relatively large differences in current distribution, since the over-all impedance is so low. The tubular coils of FIGURE 8 have the advantage that they are better braced against repulsive or attractive forces caused by interaction of the magnetic fields generated by them. On the other hand, the disc formation withstands the expansion forces tending to enlarge the coils better than does the tubular one.

The losses in the tubular coils may be slightly smaller than those in disc coils since the leads run parallel to the lines of the magnetic fields instead of transverse thereto. However, this effect is small in comparison with the over-all power required for operation.

One advantage of the disc coils is that it is possible to make their internal diameter smaller, as the spark electrodes do not have to traverse the length of the coils for any material distance. This is purely a mechanical problem, however, and not an electrical one. Because of the magnetic field which is interposed between the spark-gap electrodes and the coils, the coils need not be insulated; any electrons which might be emitted from the electrodes or the coils, because of the fields existing between them, are immediately returned to their source and cannot penetrate the field to establish a discharge. The discharge can be maintained only in a direction which is parallel to the lines of force of the magnetic field, and consequently the spark-gap is the only place where such discharge can be maintained.

This type of "magnetic insulation" is not effective with respect to other parts of the apparatus across which high voltages are developed. Nevertheless the insulation problem is not as serious as might be expected considering the high voltages usually involved. Breakdown of insulation is progressive and starts with ionization of the insulating material, and the pulses used are in general so short that the voltage has disappeared before any material ionization, sufficiently really to start a breakdown, has taken place.

The nature of the insulation used therefore becomes very largely a question of the average temperature it will be required to withstand and the effectiveness with which it can be sealed to the other elements forming the container to hold gas at the average pressure within the container body. "Teflon" synthetic plastic is satisfactory and is preferred for operation at relatively low temperatures. Some of the silicone plastics will withstand still higher temperatures. Mica or ceramics can be used against layers of malleable copper which can be deformed under pressure to form a gasket, with or without a high-temperature sealing compound, as used for securing the cylinder heads on gasoline engines. These are engineering problems which are peculiar to specific applications of the invention. The temperatures and pressures under which it can be operated are so diverse as to make impossible a review of all situations which might be encountered.

While both forms of the apparatus thus far described employ single-turn coils, it will be recognized that any means of producing magnetic fields powerful enough to confine ions whose energy content is that of the highest temperature desired may be used instead. Single-turn coils are desirable because their low inductance makes them particularly suitable for developing strong fields with relatively moderate voltages which is virtually essential in applications where the highest possible temperatures are desired, but the fact that it is possible with the invention to produce a very localized high temperature and pressure and release it suddenly can be of value even when temperatures are involved which are readily obtainable by other means. Thus in the fixation of atmospheric nitrogen by combination with oxygen to form nitric oxide, the atoms combine best under high temperature and pressure but it is desirable to cool the combined gases very rapidly to prevent dissociation. In apparatus of the type here described the release of the gases within the reaction zone takes place the instant the fields collapse, and the cooling by expansion is accordingly very rapid.

The reaction just mentioned is endothermic, and all of the thermal energy within the heated zone must be supplied by the spark. Another method for fixing atmospheric nitrogen is through the combination with hydrogen to form ammonia. This latter reaction is highly exothermic, and if started by the spark will continue of its own accord. This latter reaction is not particularly adapted to the present invention, but it is mentioned to bring out the fact that at temperatures above those required for ionization the magnetic fields will confine the body of gas treated irrespective of whether its thermal energy is derived from the spark or from some internal source.

If it were desired to employ the principles of the invention to promote reactions of either of these two types, the constructional parameters could be on an entirely different scale from those shown, wherein the desideratum is the attainment of the highest temperatures possible. The specific types shown are therefore not intended as limiting the scope of the invention, but rather to illustrate means for employing it under extreme conditions.

In using the method and apparatus of the present invention for the promotion of a thermonuclear fusion reaction, the attainment of the highest possible temperatures is required. Under such extreme operating conditions, when the spark is established in the presence of the magnetic field impulse, the expansion forces exerted by the magnetic flux lines on the surrounding inductance coil structure are sufficiently great that repeated operation of the apparatus has been found to lead to physical deterioration of the copper coils, thus reducing the efficiency of the apparatus in subsequent operation. In accordance with an important feature of the present invention, the physical resistance of the coil structure to mechanical shock is materially improved by employing an inductance coil structure of special segmented configuration.

Figure 12:
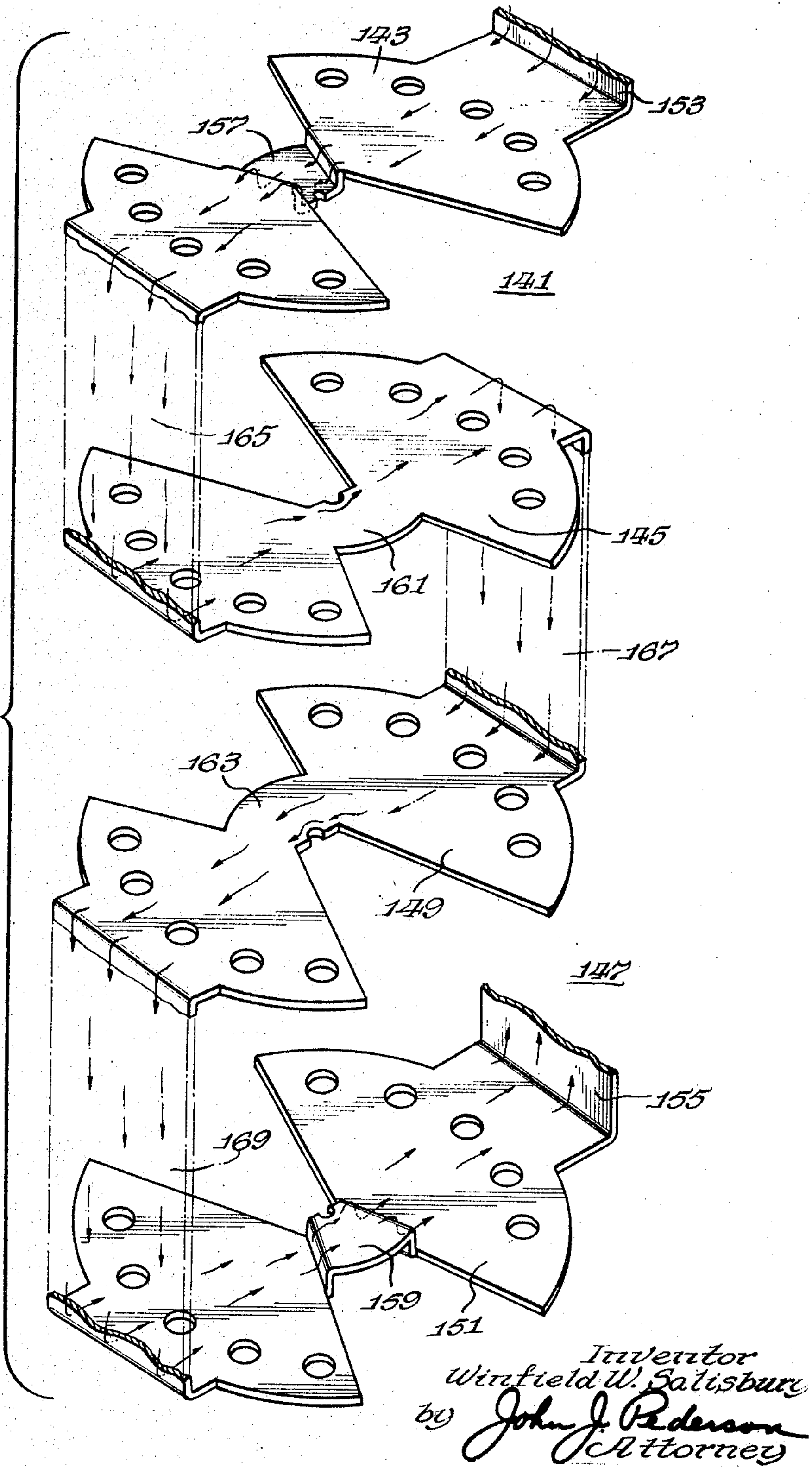
FIGURE 12 is an exploded perspective view of the inductance coil structure used in another embodiment of the invention.

FIGURE 12 is an exploded perspective view of such a segmented magnetic-field-producing coil structure comprising a pair of single turn inductance coils 141 and 147 formed of thin copper sheeting. Each of the coils comprises a pair of specially formed copper sheets disposed in closely spaced parallel planes with intervening thin insulating sheets (not shown in FIGURE 12) of "Teflon" or the like. The upper coil 141 is composed of two segments 143 and 145 each of which constitutes one-half turn of coil 141. Similarly, the lower coil 147 is composed of two half-turn segments 149 and 151. The entire assembly may be most conveniently formed out of a continuous sheet of thin copper material and is provided with a pair of integral supply leads 153 and 155 at the two extremities. The central portions of coil segments 143, 145, 149 and 151 are each provided with a semicircular notch or cutout, and the central portions 157 and 159 of coil segments 143 and 151 respectively are offset inwardly of the assembly to be coplanar with the juxtaposed central sections 161 and 163 of coil segments 145 and 149 respectively. Coil segments 143, 145, 149 and 151 are interconnected in series by means of connecting strips 165, 167 and 169 which are indicated in expanded form in dotted outline to facilitate visualization of the composite structure. With this construction, when the external supply leads 153 and 155 are conneced to an appropriate power supply such as network 69 of the circuit described in connection with FIGURE 4, the magnetic field producing current pulse flows in opposite directions in adjacent coil segments as indicated by the arrows in FIGURE 12, and the resultant magnetic field is of the same configuration and intensity as that established by the coil structure of FIGURE 6. However, the segmented coil construction of FIGURE 12 is capable of withstanding materially greater mechanical shock without rupture or other physical deterioration by virtue of the increased lateral compliance of the individual coil segments. In other words, the construction is such that the impact of the shock-wave is dissipated largely in outward lateral displacement of the individual coil sections before stresses of sufficient concentration and magnitude to cause rupture are developed.

It should be apparent that specifically different segmented configurations may be employed to provide the inductance coil structure with increased resistance to mechanical shock attributable to magnetic field expansion on passing the spark discharge. For example, instead of employing two half-turn segments, three or more segments each corresponding to a fraction of a turn may be juxtaposed in a common plane to constitute effectively a single-turn coil. Any such construction in accordance with the present invention comprises a plurality of discrete fractional turn sections, each constructed of a thin flat sheet of conductive material, assembled in angularly displaced mutually overlapping relation and collectively defining an internal aperture small relative to the projected surface area of the assembly. Preferably, the discrete sections are assembled in closely spaced parallel planes and at least all but one of the sections is provided with an offset portion disposed in a common plane with circumferentially displaced corresponding portion of the remaining sections so that all of the central portions collectively circumscribe an aperture small relative to the projected surface area of the assembly. The coil sections are insulated from each other, preferably by the interposition of thin sheets of insulating material, and means are provided for electrically interconnecting the sections in series so that electric current passing through the central portions generates a concentrated magnetic field of substantially the same intensity and configuration as an integral single-turn construction of generally similar configuration.

FIGURE 13 is a cross-sectional view, similar to that of FIGURE 1, of apparatus constructed in accordance with the invention and embodying a magnetic-field-producing coil structure of the type shown in FIGURE 12. Coil structure 171 is clamped between discs 1 and 3, and separate layers of insulating material 173 are provided between adjacent layers of the composite coil structure. If desired, spacer blocks 175, constructed of insulating material such as polyethylene, may be provided to maintain the composite coil structure 171 in the desired spatial relationship within the chamber. An intervening sheet 177 of insulating material, of "Teflon" or the like, is interposed between the closely separated output strip leads 153, 155. In other respects, the apparatus of FIGURE 13 is similar to that of FIGURE 1.

FIGURE 14 is a plan view of the assembled inductance coil structure 171. To complete the seal between the inductance coil structure and the discs 1 and 3, additional blocks 179, which may be of ceramic shaped to correspond to the peripheral notches in the copper sheeting of which inductance coil structure 171 is composed and sintered in situ, may also be provided.

The cross-sectional view of FIGURE 15 is provided to facilitate visualization of the physical relationship between the parts in the assembled apparatus of FIGURE 13.

The apparatus of FIGURES 13–15 functions in precisely the same manner as that of FIGURES 1 and 2 except for the considerable improvement in physical resistance of the inductance coil structure to mechanical shock as described in connection with FIGURE 12.

FIGURE 16 is a view similar to that of FIGURE 13 showing a slightly different embodiment of the invention in which the inductance coil structure 181 is not only segmented to provide increased physical resistance to mechanical shock, but is also formed of a special configuration to provide complete sealing of the chamber without requiring spacer inserts. The construction of FIGURE 16 is identical to FIGURE 13 except for the construction of inductance coil structure 181, which is shown in detail in the exploded views of FIGURES 18*a* and 18*b*.

The inductance coil construction of FIGURES 18*a* and 18*b* is composed of five individual units each formed from a thin flat sheet of conductive material such as copper. The first unit includes one of the power supply leads 153 and a half-turn coil section 183. The second unit comprises a connecting element 185 electrically and mechanically connected to the upper surface of a flange 187 of the first unit by surface brazing, soldering or the like as indicated as 189. Connecting element 185 is connected in turn to a second coil element 191, which comprises a half-turn coil section 193, by means of an integral connecting line 195.

The third unit of the composite inductance coil structure, of which one portion is shown in FIGURE 18*a* and the other portion in FIGURE 18*b*, comprises a connecting element 197 similar to element 185 which is affixed to coil element 191 along its upper surface as indicated at 199. An integral connecting link 201 connects element 197 to a third coil element 203 comprising a half-turn coil section 205.

The fourth unit is composed of a third connecting element 207, the upper surface 209 of which is affixed to the under surface of a flange 211 of coil element 203, an integral connecting link 213, and a fourth coil element 215 comprising a half-turn coil section 217. The under surface of a flange 219 of coil element 215 is affixed to the upper surface 221 of a fourth connecting element 223 which, together with power supply lead 155, constitutes the fifth unit of the composite inductance coil structure. When assembled, the composite inductance coil structure comprises eight discrete layers of thin-sheet conductive material. The outermost coil sections 183 and 217 are offset toward the center of the assembly to be substantially coplanar with the intermediate coil sections 193 and 205, respectively. Thin sheets of insulating material, such as "Teflon" or the like, are interposed between elements 187 and 197, elements 191 and 203, and elements 207 and 215. These insulating sheets have been omitted in FIGURES 18*a* and 18*b* to avoid unnecessarily confusing the drawing, but are designated by the reference numeral 222 in the cross-sectional view of FIGURE 16. Additional insulating sheets 224 are also provided between the outermost elements 185 and 223 and the discs 1 and 3 defining the reaction chamber.

The direction of current flow through the inductance coil assembly is indicated by arrows in FIGURES 18*a* and 18b. All of the half-turn coil sections 183, 193, 205 and 217 are connected electrically in series in the assembly, and current flow through each of the coil sections is in a clockwise direction, as viewed in FIGURES 18*a* and 18*b*, around the central aperture defining the reaction space.

Electrically, the inductance coil structure of FIGURES 18*a* and 18*b* is fully equivalent to that of FIGURE 12. Moreover, the construction of FIGURES 18*a* and 18*b* exhibits the same characteristic physical resistance to mechanical shock as the FIGURE 12 embodiment, since the inductance coils are segmented in the same manner. However, the requirement for spacer inserts to provide sealing of the reaction chamber is avoided by providing each of the eight layers of the composite structure with an integral ring 225 having an internal diameter corresponding to that of the reaction chamber. With the illustrated construction, rings 225 are electrically inert; since all portions of each ring 225 are maintained at a common potential, there can be no current flow therethrough. However, as illustrated in FIGURE 16, when the coil structure is assembled between discs 1 and 3, with the appropriate layers 222 and 224 of insulating material, the aggregate thickness of the assembly within the internal flange area of discs 1 and 3 circumscribed by bolts 5 is uniform. Consequently, the requirement for spacer inserts, inherent in the construction of FIGURES 12–14, is avoided.

If desired, appropriate internal spacers 175 may be provided as in the embodiment of FIGURES 12–14 to maintain the coil assembly in the desired position within the reaction chamber although, as in all illustrated embodiments of the invention, the sheet conductive elements of which the coil assembly is formed may be sufficiently self-sustaining so that spacers 175 may be omitted.

In order to produce a confining magnetic field of even higher intensity, and thus to permit the attainment of higher operating temperatures within the reaction space, the inductance coil structure may comprise a current transformer having a plurality of primary turns and a single turn secondary in the form of a flux concentrator. Such a construction is illustrated in the embodiment of FIGURES 19–23, inclusive.

In FIGURE 19, the input leads 153, 155 to the inductance coil structure are connected internally of the reaction chamber to the opposite ends of a multi-turn primary winding 231 of a current transformer, the secondary of which is of special configuration to serve as a flux concentrator. Primary winding 231 is preferably of cylindrical overall configuration and may comprise three and one-half closely spaced turns of copper or other appropriate highly conductive material. The cross-sectional dimensions of the individual turns are sufficiently large that substantially the entire current flow through the primary winding is concentrated by skin effect at its internal surface. A primary winding of this construction may be formed by manually removing a helical segment from a solid copper cylinder. One end of the primary winding is soldered or otherwise electrically and mechanically fixed to one of the lead-in strips 153, as indicated at 233. The other end of the primary winding 231 is similarly connected to a cup-shaped conductive member 235 of copper or the like which closely envelops primary winding 231 and is separated therefrom by a layer of thin insulating material 237. Member 235 in turn is electrically and mechanically connected to lead 155. A construction of this type minimizes the lead inductance to transformer primary winding 231.

A specially formed flux concentrator secondary winding is illustrated in the exploded perspective view of FIGURE 21 and comprises two segments 239, 241 of generally semi-cylindrical configuration which are mutually juxtaposed to fit snugly within a cylindrical insulating member 243 contained within primary winding 231. Segments 239 and 241 are mutually insulated from each other by means of a pair of insulating inserts 245. In assembled form, the secondary 239, 241, which is preferably constructed of solid copper, presents a cylindrical outer surface closely coupled to primary winding 231 and is internally tapered at both ends to receive spark electrodes 25 and 29. Minimum-diameter annuli 247, provided with central openings only large enough to admit the opposing spark points 25 and 29, are provided, and the region between annuli 247 is enlarged to define the reaction space 249 in a manner similar to the single-coil construction of FIGURE 7. Each of the annuli 247 constitutes effectively a single-turn inductance coil since the secondary current flow is concentrated therein by skin effect.

The entire transformer comprising primary 231 and secondary 239, 241 and constituting the inductance coil structure is appropriately positioned within the reaction chamber by means of suitably formed insulating spacer members 251 which may be of any appropriate configuration while permitting the free access of gas to all regions within the reaction chamber.

FIGURE 20 is a cross-sectional veiw of the apparatus of FIGURE 19 showing the relationship between the primary and secondary windings when assembled. Also, as shown in FIGURE 20, leads 153 and 155 and intervening insulating sheet 177 may be provided with integral rings 252 extending around the full periphery of the reaction chamber, to provide an effective seal between discs 1 and 3. As in the case of rings 225 of the inductance coil assembly of FIGURES 18*a* and 18*b*, these rings are electrically inert since all portions of each such ring are maintained at a common potential.

In operation, when a short current pulse of high intensity is impressed on primary winding 231 through input leads 153 and 155 from pulse network 69 in the circuit of FIGURE 4, circulating currents are generated in the single-turn secondary 239, 241 by conventional transformer action. These currents are concentrated at the inner and outer surfaces of the secondary unit by skin effect and flow in the manner indicated by the arrows in FIGURE 22, so that although the secondary unit is divided into two sections, current flow through annuli 247 is in the same direction, e.g., clockwise, in both sections 239 and 241. Moreover, by virtue of the particular construction of the secondary unit, the secondary current which is distributed throughout the entire outer surfaces of elements 239, 241 is concentrated within the restricted area annuli 247, as best indicated in FIGURE 23 in which currents flowing into the plane of the drawing are represented by crosses and currents flowing out of the plane of the drawing by points in the conventional manner. As a result of the transformer action in conjunction with the concentrating effect of the secondary unit on the magnetic field-producing current pulses, the intensity of the magneitc field encompassing reaction space 249 is substantially higher than that produced with the previously described embodiments, although the configuration of the field is maintained substantially unaltered. When an electric discharge is passed between points 25 and 29 in the presence of the encompassing magnetic field, extremely high operating temperatures are produced, and when the material contained within the reaction chamber comprises a nuclear reactant such as deuterium gas, thermonuclear fusion accompanied by the liberation of many millions of electron volts of energy may be achieved. Because the secondary unit is of segmented construction, the embodiment of FIGURE 19 exhibits the same characteristic physical resistance to expansion forces exerted by the magnetic field as in the embodiments of FIGURES 13 and 16.

The embodiment of FIGURE 24 is basically similar to that of FIGURE 19 except that the spark discharge is initiated without the use of a spark plug or analogous device. This is accomplished by partially integrating the spark producing structure with the magnetic field producing structure. The construction of primary winding 231 and its connection to leads 153 and 155 may be identically the same as in the embodiment of FIGURE 19. The secondary unit, however, is bisected transversely as well as longitudinally, and the four elements 261, 263, 265 and 267 thus provided are mutually insulated from each other by the interposition of appropriate thin sheets 269 of insulating material. A pair of electrodes 271 and 273, which may be constructed of appropriate refractory metal such as tungsten, are electrically and mechanically connected to diagonally opposite elements 261 and 267, respectively, of the flux concentrator secondary unit, these electrodes extending into the internal apertures of annuli 247 situated on the longitudinal axis of the reaction space 249.

To provide for the application of a sparking voltage between electrodes 271 and 273, element 261 of the flux concentrator secondary unit is soldered or otherwise mechanically and electrically connected to a cup-shaped connecting member 275 closely overlying member 235 and separated therefrom by a thin sheet of insulating material 277. Connecting member 275 in turn is electrically and mechanically attached to a thin flat conductive lead 279 which extends through the wall of the chamber for connection to an external source of sparking voltage such as delay line 83 of FIGURE 4. Element 267 of the flux concentrator secondary unit is similarly connected to an extension 281 of a similar thin flat sheet lead 283 extending through the wall of the chamber in closely spaced parallel juxtaposition with lead 279; appropriate sheets of insulating material 285 are provided between leads 279 and 283, and additional sheets of insulating material 287 are provided for isolating leads 279 and 283 from the conductive discs 1 and 3 constituting the reaction chamber. Lead extension 281 is insulated from primary winding 231 and the other leads by means of insulating material 243, and secondary elements 263 and 265 are insulated from the lead-in structure by additional insulating material 289.

The operation of the embodiment of FIGURE 24 is precisely the same as that involved with the embodiment of FIGURE 19 with the exception that the spark plug construction has been replaced by simple electrodes 271 and 273 and their connections to input leads 279 and 283. High intensity current pulses are impressed on primary winding 231 through leads 153 and 155, and a high voltage is impressed between leads 279 and 283 to pass a spark between points 271 and 273 in the presence of the magnetic field encompassing the reaction space in response to the applied current pulses. The construction of FIGURE 24 maintains minimum spacing between the thin flat sheet type leads and other connecting elements in order to minimize stray inductance and permit the attainment of the highest field intensities and, therefore, the highest possible operating temperatures in the reaction space.

FIGURE 25 illustrates a further embodiment of the invention in which the electric-discharge-producing means is partially integrated with the magnetic-field-producing to generate the encompassing magnetic field. Leads 154 structure to an even larger extent. One input lead 154 is connected to a spark electrode 291 which may be of refractory metal such as tungsten. The other lead 156 is connected to one end of a solenoid wound coil, also of tungsten or the like, the other end of which mechanically supports and is electrically connected to a second spark electrode 295. Appropriate insulating material 178, 297, 299 is provided to prevent short-circuiting of the leads.

The operation of the embodiment of FIGURE 25 differs from that of the previously described embodiments in that a spark discharge is first passed between points 291 and 295, and the resulting current flow is employed to generate the encompassing magnetic field. Leads 154 and 156 are connected across a pulse-type high-voltage, high-current source. This produces a spark discharge between points 291 and 295, and the current flow through the spark gap passes through coil 293 to generate the encompassing magnetic field.

With this construction, the gas in the reaction space between points 291 and 295 is ionized in advance of the creation of the magnetic field. Such preionization may lead to the attainment of higher operating temperatures for the following reason. As previously pointed out, the ionized particles are incapable of traversing the lines of magnetic force. When the encompassing magnetic field is established prior to ionization of the medium in the reaction space, a portion of the magnetic flux may be confined or trapped by the ions produced upon initiation of the spark discharge. Any portion of the magnetic field thus trapped by the ion plasma is ineffective to confine the plasma, and therefore any such condition detracts from the rigidity of the "semi-permeable membrane" constituted by the encompassing field. Pre-ionization of the medium in the reaction space, as is accomplished in the embodiment of FIGURE 25, precludes any entrapment of magnetic flux by the ion plasma. Thus, a given current pulse may produce an effectively stronger magnetic field with pre-ionization than without, or, viewed in another way, the ability of the magnetic field to contain the expanding gas ions may be substantially improved by pre-ionization of the gas in the reaction space. The volume of the reaction space is thus maintained at a minimum so that, in accordance with the previously discussed gas laws, the maximum operating temperature may be achieved.

Pre-ionization of the gas in the reaction space may be accomplished with any of the illustrated embodiments of the invention simply by impressing a low-current high-voltage pulse across the discharge gap slightly before the initiation of the magnetic-field-producing current pulse in the inductance coil structure. Once the gap has broken down, due to ionization of gas particles within the reaction space, the magnetic field may be created for a predetermined time interval, and during that time interval a large current pulse at low voltage may be passed through the already ionized gas to raise the energy level within the reaction space to the maximum obtainable operating temperature.

FIGURE 26 is a schematic diagram of a power supply system similar to that of FIGURE 4 but modified to provide for pre-ionization of the gas in the reaction space. Pulse-forming network 83 is connected to spark point 29 through a large inductance 86 and a spark gap switch 301 which may be actuated by a starting trigger 303. A take-off coil 305 is inductively coupled to one of inductance elements 85 near the discharge end of pulse-forming network 83 to actuate a trigger 307 which in turn operates a spark gap switch 309 connected between pulse-forming network 69 and the magnetic-field-producing inductance coil structure 55, 61. An additional take-off coil 311 is also coupled to one of inductance coils 85 of pulse-forming network 83 to actuate a trigger 313 which operates a spark gap switch 315 connected across inductance 86. Take-off coils 305 and 311 may be adjustably positioned with respect to pulse-forming network 83, but take-off coil 311 will generally be coupled to an inductance coil 85 more remote from the discharge end of pulse-forming network 83 than take-off coil 305.

In operation, actuation of starting trigger 303 applies a high-voltage low-current pulse from network 83 through inductance 86 across the spark gap 29, 25, creating a low-energy spark which ionizes the gas in the reaction space. After a slight delay, which is controllable by the positioning of take-off coil 305, trigger 307 is actuated to operate spark gap switch 309 resulting in the application of a large-current pulse from network 69 through inductance coil structure 55, 61 to create a concentrated magnetic field substantially surrounding the reaction space containing the pre-ionized gas. After a further short delay, but before the collapse of the encompassing magnetic field, trigger 313 is actuated by a pulse induced in take-off coil 311, resulting in the operation of spark gap switch 315 to short-circuit inductance 86. This results in the application of a large-current through spark gap switch 301, which remains conductive throughout the entire operating cycle since the deionization time of such devices is materially longer than the firing time, resulting in the application of a large amount of thermal energy in the form of a low-voltage high-current spark between the electrodes 29 and 25. In this manner thermal energy of an amount several orders of magnitude greater than the quantum threshold required for ionization is applied to each of the ionized particles in the reaction space, in the presence of the encompassing magnetic field. Ionization of the gas in the reaction space in advance of the creation of the magnetic field results in an increased magnetic field gradient, as previously explained, so that the volume of the reaction space is maintained at a minimum with a resulting substantial decrease in radiation loss as compared with operation of the apparatus with the magnetic field preceding the ionizing spark.

The pre-ionization of the gas in the reaction space may be accomplished with any of the embodiments of the invention by employing the power supply arrangement of FIGURE 26 which is shown for illustrative purposes only since there are many other types of power supply arrangements which may be employed. Particular success has been achieved with the use of a condenser-discharge type of power supply as distinguished from a pulse-forming network arrangement such as that shown in FIGURE 26.

As previously explained, particularly in connection with FIGURES 5 and 6, the two coils or coil assemblies may be arranged to create either bucking or boosting magnetic fields. In the special case in which thermonuclear fusion is the principal object to be attained, there may be an additional advantage in employing opposed magnetic fields. When the fields are co-directional, or boosting, the ion orbits at both axial ends of the reaction space are similarly oriented; in other words, all of the ions have a common direction of orbital rotation. With opposed magnetic fields, the direction of orbital rotation at one end of the reaction space is opposite from that at the other with the result that the likelihood or probability of ion collision may be materially increased. The embodiment of FIGURES 27–29 comprises a transformer-type inductance coil structure with a flux concentrator secondary and retains all the advantages associated therewith, in addition to providing for the generation of opposed magnetic fields to increase the probability of ion collision. Moreover, this embodiment of the invention incorporates additional improvements to facilitate the development of still higher operating temperatures in the reaction space.

In the embodiment of FIGURE 27, the inductance coil structure comprises a flux concentrator secondary unit 321 which is bisected both longitudinally and transversely as in the embodiment of FIGURE 24. However, the spark points 271 and 273 of FIGURE 24 are omitted and the longitudinal sections of concentrator 321 are relieved at the transverse division plane to admit a spark point 323 fixed to the conductive wall 325 of the reaction chamber, which in operation is grounded, and the point 327 of the spark plug 329 extending through the opposite wall 331 of the reaction chamber, thus constituting a transverse spark gap across the reaction space 333. A thin insulating sheath 335 surrounds concentrator 321, and a pair of layer-wound primary windings 337 and 339 are respectively coupled to the individual longitudinal segments of concentrator 321. Primary windings 337 and 339 each comprise a plurality of closely spaced turns of conductive strip material such as copper, separated by respective layers of insulating material 341 and 343, and are wound in opposite directions, winding 337 being wound clock-wise and winding 339 counterclockwise, for example, as viewed from the left side of FIGURE 27. Integral thin flat sheet leads 345 and 347 are provided for primary windings 337 and 339 respectively, these leads being closely spaced and separated by thin sheets of insulating material 349 and 351 respectively to minimize the lead inductance. As in other embodiments of the invention, the lead strips extending through the walls of the reaction chamber are formed to provide integral rings 353, best shown in FIGURE 28, extending around the full periphery of the reaction chamber to ensure a gas tight seal. As shown in FIGURE 29, suitable insulation strips 355 are provided between the longitudinal end sections of the flux concentrator secondary 321, and as shown in FIGURE 27, similar insulating material 357 is provided between the transverse segments of concentrator 321.

In operation, the embodiment of FIGURES 27 and 29 is similar to that of FIGURES 19–23 except that the provision of the longitudinally divided concentrator 321 in conjunction with separate primary windings 337 and 339 provides for the generation of oppositely directed magnetic fields at opposite ends of reaction space 333, the configuration being similar to that shown in FIGURE 5 except that the flux concentration and the strength of the magnetic field are considerably increased. Also, a transverse spark gap may be employed in conjunction with opposed magnetic fields, as illustrated, although it should be understood that the embodiment of FIGURE 27 may be modified to provide an axial spark gap if desired. By layer-winding primary windings 337 and 339, closer coupling between the primary windings and the flux concentrator sections is achieved, leading to increased strength of the resultant magnetic field to exert a greater constraining action on the ions in the reaction space and thus permit the achievement of higher operating temperatures.

Leads 345 and 347 may be interconnected externally of the chamber and connected in parallel across the output of pulse-forming network 69 of FIGURE 4 or of FIGURE 26, depending on whether or not pre-ionization of the gas in the reaction space is desired.

By way of summary, it may be helpful to itemize the types of structural modifications of the basic apparatus of FIGURE 1 which may be employed to increase the operating temperature obtained in the reaction space.

(1) Increasing the strength of the encompassing magnetic field, which may be accomplished by employing a transformer-type inductance coil structure, preferably with a flux concentrator secondary. In this regard, transformers with layer-wound primaries may afford closer transformer coupling leading to still further increased magnetic field strength.

(2) Increasing the gas pressure within the reaction chamber.

(3) Ionizing the gas in the reaction space in advance of the generation of the magnetic field, to increase the effective magnetic field gradient and reduce the effective size of the reaction space.

(4) Employing oppositely directed magnetic fields at opposite ends of the reaction space to achieve greater randomness of the ion orbits, with a resultant increase in the likelihood of ion collision.

(5) Employing an inductance coil structure of segmented configuration, so that the inductance coil structure is rendered physically capable of supporting magnetic fields of greater intensity which in turn are capable of containing the ions within a smaller reaction space.

It should be understood that these itemized improvements may be employed individually or in any desired combination, the optimum combination being dependent on the intended application of the apparatus.

The method and apparatus of the present invention may be utilized in any of a large number of different ways. For example, one wall of a suitably shielded sealed reaction chamber containing deuterium gas may be constituted by a piston connected to a crankshaft and enclosed within a metal bellows to prevent the escape of gas from the reaction chamber. Recurrent pulse type operation of the apparatus as thus modified results in rotation of the crank shaft, providing an internal combustion engine which, operating on the basis of thermonuclear fusion, may be employed to drive an automobile for a period of years without re-charging the reaction chamber with deuterium gas. In another illustrative application, the apparatus of the present invention may be coupled through a heat exchanger to drive a steam engine; the heat exchange medium may be any of those conventionally employed such as water or mercury, or a continuous flow of the gas used as a reactant may be maintained through the reaction chamber and the reacting gas itself used as the heat exchange medium. There are innumerable other applications for nuclear power, and the apparatus of the present invention is readily adaptable to the extraction of useful power in numerous ways. Moreover, unlike nuclear reactors and other presently known sources of nuclear power, the apparatus of the present invention is compact and simple to construct, and does not require the use of rare and expensive radioactive materials.

As has been previously mentioned the method and apparatus of the invention may be employed to advantage with respect to the spectroscopic analysis of elements, compounds and other materials. Also, when operated at a temperature sufficient to achieve nuclear fusion, the apparatus of the present invention provides a convenient source of neutron energy which is practical, relatively economical, and convenient to control. Other applications of the invention will occur to those skilled in the art, and numerous variations and modifications of the illustrated apparatus may be made without departing from the true spirit and scope of the invention; accordingly it is intended by the appended claims to cover all such variations and modifications, as well as all utilizations and applications, of the described invention.

I claim:

1. Apparatus for producing high temperatures comprising: an inductance coil structure encompassing a magnetic-field-free reaction space; means for producing an electric current pulse in said inductance coil structure to develop a concentrated magnetic field, of an intensity of at least of the order of $10^6$ gauss, substantially encompassing said reaction space; and means for producing a cloud or plasma of ions in said reaction space during the existence of said magnetic field.

2. Apparatus for producing high temperatures comprising: an inductance coil structure encompassing a double-ended magnetic-field-free reaction space; means for producing an electric current pulse in said inductance coil structure to develop a concentrated magnetic field substantially entirely enclosing said reaction space both axially and radially; and means for producing a cloud of ions in said reaction space during the existence of said magnetic field, in which said electric current pulse is of such short duration that it is concentrated near the internal surface of said inductance coil structure by skin effect.

3. Apparatus for producing high temperatures comprising: an inductance coil structure encompassing a double-ended magnetic field-free reaction space; means for producing an electric current pulse in said inductance coil structure to develop a concentrated magnetic field substantially entirely enclosing said reaction space both axially and radially; and means for producing a cloud of ions in said reaction space during the existence of said magnetic field, in which the duration of said electric current pulse is so short and said reaction space is so small that a magnetic flux of intensity beyond that which can normally be held by said inductance coil structure is nevertheless restrained by the inertia of such structure for a predetermined time interval, and in which said cloud of ions is produced in said reaction space within said predetermined time interval.

4. Apparatus for producing high temperatures comprising: means for recurrently developing a concentrated pulsed magnetic field substantially encompassing a magnetic-field-free reaction space of a length comparable to its diameter, the interval between successive magnetic field pulses being long with respect to the duration of any individual one of said pulses; and means for recurrently producing a cloud or plasma of ions in said reaction space in synchronism with said pulsed magnetic field.

5. Apparatus for producing high temperatures comprising: means for developing a concentrated pulsed magnetic field having an intensity at least of the order of ten million gauss and substantially encompassing a magnetic-field-free reaction space; and means for producing a cloud or plasma of ions in said reaction space in synchronism with said pulsed magnetic field.

6. Apparatus for producing high temperatures comprising: means including a pair of inductance coils for developing a concentrated magnetic field having at least one axis of symmetry with the flux lines of said magnetic field having a radial bulge near the median transverse plane of said field to substantially enclose a magnetic-field-free reaction space of a length comparable to its diameter, and said flux lines being oppositely directed at opposite axial ends of said reaction space and substantially more concentrated near the axial ends of said reaction space than in said median transverse plane; gaseous matter in said reaction space; and means for passing an electric discharge through said reaction space along said axis of symmetry in the presence of said magnetic field to ionize said gaseous matter and impart kinetic energy to the resulting ions.

7. Apparatus for producing high temperatures comprising: means including an inductance coil structure for producing a concentrated magnetic field with the flux lines of said magnetic field having a radial bulge near the median transverse plane of said field to substantially enclose a magnetic-field-free reaction space and said flux lines being oppositely directed at opposite axial ends of said reaction space and substantially more concentrated near said axial ends than in said median transverse plane, said field having a transverse axis of symmetry in said median transverse plane; gas particles in said reaction space; and means for passing an electric discharge through said reaction space along said transverse axis of symmetry during the existence of said magnetic field to ionize said gas particles and impart kinetic energy to the resulting ions.

8. Apparatus for producing high temperatures comprising: means for developing a concentrated pulsed magnetic field substantially encompassing a magnetic-field-free reaction space; gaseous matter in said reaction space of a length comparable to its diameter; and means for passing an electric discharge through said reaction space in synchronism with said pulsed magnetic field to ionize said gaseous matter and impart kinetic energy to the resulting ions.

9. Apparatus for producing high temperatures comprising: means for developing a concentrated pulsed magnetic field, of an intensity at least of the order of ten million gauss, having at least one axis of symmetry and substantially encompassing a magnetic-field-free reaction space; gaseous matter at greater than atmospheric pressure in said reaction space; and means for passing an electric discharge through said reaction space along said axis of symmetry in synchronism with said pulsed magnetic field to ionize said gaseous matter and impart kinetic energy to the resulting ions.

10. Apparatus for producing high temperatures comprising: a pair of coaxial inductance coils; means for concurrently passing electric current through said inductance coils to develop a concentrated magnetic field substantially encompassing a magnetic-field-free reaction space; gaseous matter in said reaction space; and means for passing an electric discharge through said reaction space during the existence of said magnetic field to ionize said gaseous matter and impart kinetic energy to the resulting ions.

11. Apparatus in accordance with claim 10, in which said inductance coils are electrically connected in series.

12. Apparatus in accordance with claim 10, in which said inductance coils are electrically connected in parallel.

13. Apparatus in accordance with claim 10, in which said inductance coils are electrically interconnected in series-aiding relationship.

14. Apparatus in accordance with claim 10, in which said inductance coils are electrically interconnected in series-opposing relationship.

15. Apparatus in accordance with claim 10, in which said inductance coils each consist of a single turn.

16. Apparatus in accordance with claim 15, in which each of said single-turn inductance coils is formed of conductive sheet material of a thickness which is small relative to its width, and in which the internal diameter of each such single-turn inductance coil is also small relative to the width of such sheet material.

17. Apparatus in accordance with claim 16, in which said single-turn inductance coils are disposed in parallel planes axially spaced by a distance of the same order of magnitude as said internal diameter.

18. Apparatus in accordance with claim 17, in which the means for producing said electric discharge through said reaction space comprises a pair of electrodes disposed coaxially with said inductance coils on opposite sides of said reaction space.

19. Apparatus for producing high temperatures comprising: a pair of spaced electrodes defining a spark gap; and means including an inductance coil structure for developing a concentrated magnetic field substantially entirely enclosing, both axially and radially, a double-ended magnetic-field-free reaction space which contains said spark gap and having an axis of symmetry substantially coincident with said spark gap, in which said inductance coil structure comprises an air core transformer comprising a flux concentrator encompassed by a primary winding inductively coupled thereto.

20. Apparatus according to claim 19, in which said flux concentrator is of segmented construction.

21. Apparatus according to claim 19, in which said flux concentrator is bisected both longitudinally and transversely, and in which the resulting segments are mutually insulated.

22. Apparatus according to claim 21, in which said electrodes are electrically and mechanically connected to respective ones of said segments.

23. Apparatus according to claim 19, in which said primary winding is layer-wound of thin flat conductive strip material.

24. Apparatus according to claim 19, in which said inductance coil structure comprises a longitudinally and transversely bisected flux concentrator encompassed by a pair of primary windings individually inductively coupled to one half of said flux concentrator.

25. Apparatus according to claim 24, in which said primary windings are wound in opposite directions.

26. Apparatus for producing high temperatures comprising: a pair of spaced electrodes defining a spark gap; and means including an inductance coil structure for developing a concentrated magnetic field substantially entirely enclosing, both axially and radially, a double-ended magnetic-field-free reaction space which contains said spark gap and having an axis of symmetry substantially coincident with said spark gap, in which the current flow across said spark gap is passed through said inductance coil structure to develop said magnetic field.

27. Apparatus for producing high temperatures comprising: a pair of spaced electrodes defining a spark gap and means including an inductance coil structure for developing a concentrated magnetic field substantially entirely enclosing, both axially and radially, a double ended magnetic-field-free reaction space which contains said spark gap and having an axis of symmetry substantially coincident with said spark gap, in which said inductance coil structure is segmented to withstand lateral expansion forces.

28. Apparatus according to claim 27, in which said inductance coil structure is contained within a sealed chamber and individual segments of said inductance coil structure are provided with integral sealing rings.

29. A method of producing high temperatures in a gaseous medium contained within a double-ended reaction space comprising: ionizing the gas contained within said reaction space; thereafter, but before substantial deionization of said gas developing a concentrated magnetic field substantially entirely enclosing said reaction space both axially and radially; and supplying additional energy to the ions contained in said reaction space while said magnetic field persists, in which said gas is ionized and said additional energy is supplied by passing an electric spark through said reaction space.

30. A method of producing high temperatures in a gaseous medium contained within a double-ended reaction space comprising: ionizing the gas contained within said reaction space; thereafter, but before substantial deionization of said gas developing a concentrated magnetic field substantially entirely enclosing said reaction space both axially and radially; and supplying additional energy to the ions contained in said reaction space while said magnetic field persists, in which said gas is ionized by passing an electric spark through said reaction space and said additional energy is supplied by increasing the intensity of said electric spark.

31. The method of claim 30, in which said gas is a nuclear reactant and said magnetic field is of an intensity at least of the order of $10^6$ gauss.

32. Apparatus for generating a very high temperature, comprising a plurality of continuous hoop-like electrical conductors disposed in generally parallel relationship and each having a split or gap at only one point therein, said conductors being provided around a cavity, said conductors being electrically separate from each other whereby each defines a single turn of conductive material about said cavity.

33. Apparatus for generating extremely high temperatures and intense light, comprising a plurality of generally parallel electrical conductors having openings shaped to form a cavity, each of said conductors being formed with a gap or split at only one point therein to provide single-turn electrical circuits around said cavity, and conductor means to conduct current to and from each of said conductors at opposite sides of the gap or split therein.

34. Apparatus for generating extremely high temperatures and intense light, comprising a plurality of generally parallel electrical conductors having openings shaped to form a spheroidal cavity, each of said conductors being formed with a gap or split at only one point therein to provide single-turn electric circuits around said cavity, and conductor means to conduct current to and from each of said conductors at opposite sides of the gap or split therein.

35. The invention as claimed in claim 34, in which means are provided to insulate said conductors from each other, and to maintain said cavity in a substantially evacuated condition.

36. Apparatus for generating an extremely high temperature which comprises electrical conductor means to define a generally spheroidal cavity, said electrical conductor means being continuous around said cavity except for a single split or gap separating said electrical conductor means into a single-turn, continuous electric circuit around said cavity.

References Cited

UNITED STATES PATENTS

| | | | |
|---|---|---|---|
| 1,709,813 | 4/1929 | Henry | 204—309 |
| 2,036,899 | 4/1936 | Wait | 204—309 |
| 2,138,518 | 11/1938 | Smith | 313—161 X |
| 2,217,187 | 10/1940 | Smith | 313—161 |
| 2,239,642 | 4/1941 | Burkhardt et al. | 313—161 XR |
| 2,465,602 | 3/1949 | Perkins | 336—188 |
| 2,500,223 | 3/1950 | Wells et al. | 204—154.2 |
| 2,502,236 | 3/1950 | Smith | 313—161 XR |
| 2,535,554 | 12/1950 | Thurston | 336—183 |
| 2,543,227 | 2/1951 | Buckingham | 313—161 XR |
| 2,569,154 | 9/1951 | Donath | 313—161 X |
| 2,728,877 | 12/1955 | Fischer | 313—231 X |
| 2,820,142 | 1/1958 | Kelliher. | |
| 2,939,048 | 5/1960 | Waniek | 315—161 X |
| 2,939,049 | 5/1960 | Blackman | 315—161 X |

OTHER REFERENCES

R. F. Post: "Reviews of Modern Physics," vol. 28, No. 3, July 1956, pp. 338–340, 345, 346, 347, 359, 362.

E. S. Chambers: UCRL–4830, Feb. 26, 1957, pp. 1–19.

E. G. Harris et al.: UCRL–4719, May 22, 1956, pp. 3–6.

J. Nuclear Energy II, vol. 5, pp. 71–85, A. L. Bezbatchenko et al.

JAMES W. LAWRENCE, *Primary Examiner.*

C. R. CAMPBELL, *Assistant Examiner.*

U.S. Cl. X.R.

176—6; 204—154.5; 313—231; 315—111